US011781040B2

(12) United States Patent
Kim et al.

(10) Patent No.: US 11,781,040 B2
(45) Date of Patent: Oct. 10, 2023

(54) ADHESIVE FILM AND OPTICAL MEMBER COMPRISING SAME

(71) Applicant: SAMSUNG SDI CO., LTD., Yongin-si Gyeonggi-do (KR)

(72) Inventors: Ji Ho Kim, Suwon-si (KR); Tae Ji Kim, Suwon-si (KR); Jung Hyo Lee, Suwon-si (KR); Il Jin Kim, Suwon-si (KR); Dong Myeong Shin, Suwon-si (KR); Do Young Kim, Suwon-si (KR); Young Hoon Kim, Suwon-si (KR); Oh Hyeon Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 483 days.

(21) Appl. No.: 16/642,831

(22) PCT Filed: Aug. 30, 2018

(86) PCT No.: PCT/KR2018/010052
§ 371 (c)(1),
(2) Date: Feb. 27, 2020

(87) PCT Pub. No.: WO2019/045479
PCT Pub. Date: Mar. 7, 2019

(65) Prior Publication Data
US 2020/0347269 A1    Nov. 5, 2020

(30) Foreign Application Priority Data

Aug. 31, 2017  (KR) .................. 10-2017-0111194
Sep. 8, 2017   (KR) .................. 10-2017-0114928
Aug. 24, 2018  (KR) .................. 10-2018-0099505

(51) Int. Cl.
*B32B 9/00*      (2006.01)
*B32B 33/00*     (2006.01)
*C08F 2/46*      (2006.01)
*C08F 2/50*      (2006.01)
*C08G 61/04*     (2006.01)
*C09J 4/00*      (2006.01)
*C08G 77/442*    (2006.01)
*C09J 7/25*      (2018.01)
*C09J 7/40*      (2018.01)
*C08F 220/18*    (2006.01)
*C08K 5/07*      (2006.01)
*G02B 1/10*      (2015.01)

(52) U.S. Cl.
CPC ..................... *C09J 4/00* (2013.01);
*C08F 2/50* (2013.01); *C08F 220/18* (2013.01);
*C08G 77/442* (2013.01); *C09J 7/255* (2018.01); *C09J 7/401* (2018.01); *C08K 5/07* (2013.01); *C09J 2301/408* (2020.08); *C09J 2467/005* (2013.01); *C09J 2467/006* (2013.01); *G02B 1/10* (2013.01)

(58) Field of Classification Search
CPC ... C09J 7/401; C09J 7/255; C09J 7/385; C09J 7/10; C09J 183/06; C09J 4/00; C09J 143/04; C09J 2301/408; C09J 2467/005; C09J 2467/0006; C09J 2203/318; C09J 2433/00; C08G 77/42; C08G 77/20; C08G 77/38; C08G 77/04; C08L 83/06; C08L 83/00; C08F 220/18; C08F 220/1808; C08F 220/102; C08F 220/20; C08F 220/1811; C08F 230/08; C08F 2/50; C08F 222/102; C08K 5/10; C08K 5/0075; C08K 5/07; G02B 1/14; G02B 1/10
USPC ........... 428/41.4, 41.3, 40.1; 522/71, 1, 189, 522/184, 6; 520/1
See application file for complete search history.

(56) References Cited

U.S. PATENT DOCUMENTS

| | | | |
|---|---|---|---|
| 5,066,751 A | 11/1991 | Kotachi et al. | |
| 2003/0236375 A1 | 12/2003 | SalamOne et al. | |
| 2006/0057222 A1 | 3/2006 | Linhardt et al. | |
| 2009/0075008 A1* | 3/2009 | Hwang ................ | C09J 133/14 428/41.7 |
| 2012/0125431 A1 | 5/2012 | Ozum et al. | |
| 2014/0194572 A1 | 7/2014 | Matsumoto et al. | |
| 2015/0056757 A1 | 2/2015 | Liu et al. | |
| 2015/0252125 A1 | 9/2015 | Moro et al. | |
| 2015/0280151 A1 | 10/2015 | Nam et al. | |
| 2017/0253769 A1 | 9/2017 | Cho et al. | |
| 2018/0342674 A1* | 11/2018 | Nam .................... | C07F 7/1804 |
| 2019/0071589 A1* | 3/2019 | Ieda .................... | C09J 7/38 |
| 2020/0347269 A1 | 11/2020 | Kim et al. | |
| 2021/0147721 A1* | 5/2021 | Kang ................ | C08F 220/1808 |

(Continued)

FOREIGN PATENT DOCUMENTS

CN    101747860 A    6/2010
CN    103055315 A    4/2013
(Continued)

OTHER PUBLICATIONS

Kawahara et al, JP 2012-158633 Machine Translation, Aug. 23, 2012 (Year: 2012).*
Nakamura et al, JP 2014-189716 Machine Translation, Jun. 10, 2014 (Year: 2014).*
Nakajima et al, CN 104379621 Machine Translation, Feb. 25, 2015 (Year: 2015).*
Lee et al, KR 1020150059127 Machine Translation, May 29, 2015 (Year: 2015).*

(Continued)

*Primary Examiner* — Jessica Whiteley
(74) *Attorney, Agent, or Firm* — Lewis Roca Rothgerber Christie LLP

(57) ABSTRACT

Provided are an adhesive film and an optical member comprising same, the adhesive film comprising at least two types of (meth)acrylic monomers for a (meth)acrylic prepolymer, and (meth)acrylate containing silicon, wherein the release force of the adhesive film with respect to a polyimide film is approximately 0.5 gf/in to 5 gf/in.

29 Claims, No Drawings

(56) References Cited

U.S. PATENT DOCUMENTS

2021/0277292 A1* 9/2021 Kim .................. C08F 220/1808
2021/0284877 A1* 9/2021 Han ......................... C09J 7/385
2021/0371713 A1* 12/2021 Nam ...................... C09J 133/08

FOREIGN PATENT DOCUMENTS

| | | | |
|---|---|---|---|
| CN | 103309162 A | | 9/2013 |
| CN | 104379621 | * | 2/2015 |
| CN | 104379621 A | | 2/2015 |
| CN | 104903976 A | | 9/2015 |
| CN | 105567137 A | | 5/2016 |
| CN | 107163865 A | | 9/2017 |
| CN | 107304338 A | | 10/2017 |
| CN | 110484170 A | | 11/2019 |
| CN | 111019566 A | | 4/2020 |
| DE | 102009003223 A1 | | 12/2010 |
| JP | 2-258815 A | | 10/1990 |
| JP | 2007-314758 A | | 12/2007 |
| JP | 2008-210845 A | | 9/2008 |
| JP | 2012-158633 A | | 8/2012 |
| JP | 2012158633 | * | 8/2012 |
| JP | 2013-076097 A | | 4/2013 |
| JP | 2013-213206 A | | 10/2013 |
| JP | 2014189716 | * | 6/2014 |
| JP | 2014-189716 A | | 10/2014 |
| JP | 2015-189977 A | | 11/2015 |
| JP | 2016-14827 A | | 1/2016 |
| JP | 2019-104193 A | | 6/2019 |
| KR | 10-2007-0055363 A | | 5/2007 |
| KR | 10-2011-0020133 A | | 3/2011 |
| KR | 10-2011-0071039 A | | 6/2011 |
| KR | 10-2013-0078599 A | | 7/2013 |
| KR | 10-2014-0034882 A | | 3/2014 |
| KR | 10-2015-0059127 A | | 5/2015 |
| KR | 1020150059127 | * | 5/2015 |
| KR | 10-2015-0105897 A | | 9/2015 |
| KR | 10-2015-0114400 A | | 10/2015 |
| KR | 10-2016-0004928 A | | 1/2016 |
| KR | 10-2017-0114642 A | | 10/2017 |
| KR | 10-2019-0028032 A | | 3/2019 |
| KR | 10-2019-0037137 A | | 4/2019 |
| KR | 10-2020-0006873 A | | 1/2020 |
| TW | 202016250 A | | 5/2020 |
| WO | WO 2018-078952 A1 | | 5/2018 |
| WO | WO 2019/045479 A1 | | 3/2019 |

OTHER PUBLICATIONS

Zhang Aiqing, "Pressure Sensitive Adhesives", 1$^{st}$ edition, Chemical Industry Press, (English abstract) (pp. 150-153, 161-162).
"Silicones for resin modification," ShinEtsu, Oct. 2010, pp. 1-12.
Chinese Office Action in corresponding Chinese Application No. 201880055979.9, with English translation (13 pgs.), Chinese Office Action dated Jun. 2, 2021 (11 pgs.), previously submitted on Jul. 30, 2021.
Chinese First Office Action, and partial machine English translation, dated Aug. 16, 2019 in the corresponding Chinese Patent Application No. 201680061108.9, 12 pages.
Chinese Office action dated Jul. 22, 2022 issued in corresponding CN Application No. 202110211541.9, 8 pages.
International Search Report dated Mar. 28, 2017 for PCT/KR2016/009430, filed on Aug. 25, 2016, (3 pages).
Japanese Notice of Reasons for Refusal, for Patent Application No. 2018-518429, dated Apr. 28, 2020, 3 pages.
Korean Office Action dated Oct. 21, 2022 issued in corresponding KR Application No. 10-2020-00065488 (5 pages).
Taiwan Office action dated Jan. 24, 2022 issued in corresponding TW Patent Application No. 10119333, 5 pages.
U.S. Notice of Allowance from U.S. Appl. No. 15/769,496, dated Nov. 8, 2023, 10 pages.
U.S. Office Action from U.S. Appl. No. 15/769,496, dated Feb. 24, 2021, 3 pages.
U.S. Office Action from U.S. Appl. No. 15/769,496, dated May 15, 2020, 16 pages.
U.S. Office Action from U.S. Appl. No. 15/769,496, dated May 2, 2022, 21 pages.
U.S. Final Office Action from U.S. Appl. No. 15/769,496, dated Nov. 13, 2020, 13 pages.
U.S. Office Action from U.S. Appl. No. 17/185,569, dated Sep. 1, 2022, 11 pages.
U.S. Notice of Allowance from U.S. Appl. No. 17/185,569, dated Jan. 25, 2023, 8 pages.
U.S. Office Action dated Mar. 16, 2023, issued in U.S. Appl. No. 17/332,566 (27 pages).
U.S. Final Office Action dated Jul. 20, 2023, issued in U.S. Appl. No. 17/332,566 (24 pages).

* cited by examiner

ADHESIVE FILM AND OPTICAL MEMBER COMPRISING SAME

CROSS-REFERENCE TO RELATED APPLICATIONS

This application is a U.S. National Phase Patent Application of International Application Number PCT/KR2018/010052, filed on Aug. 30, 2018, which claims priority to Korean Patent Application No. 10-2017-0111194, filed on Aug. 31, 2017, Korean Patent Application No. 10-2017-0114928, filed on Sep. 8, 2017, and Korean Patent Application No. 10-2018-0099505, filed on Aug. 24, 2018, the entire contents of all of which are incorporated herein by reference.

TECHNICAL FIELD

The present invention relates to an adhesive film and an optical member including the same.

BACKGROUND ART

Recently, there is increasing interest in wearable or foldable devices. Attempt is being made to replace a typical glass substrate of an organic light emitting diode with a polyimide film.

The polyimide film is thinner and more flexible than a glass substrate. The polyimide film requires a protective film to protect the polyimide film in a process of manufacturing an optical display. The polyimide film has completely different properties from the glass substrate in terms of thickness, surface properties, strength, and the like. Accordingly, a protective film typically used for protection of the glass substrate has restriction in application to the polyimide film. A protective film for polyimide films is required to be attached to the polyimide film and to protect the polyimide film. However, if high peel strength is required to separate the protective film from the polyimide film, there can be a problem of damage to a panel including the polyimide film. In particular, since the polyimide film is more flexible than the glass substrate, the polyimide film can be easily damaged upon separation of the protective film.

The polyimide film and the protective film are stored and delivered after being attached to each other. If physical properties of the protective film, such as peel strength and the like, are changed during this process, there can be a problem of deterioration in reliability and processability. Accordingly, there is a need for a protective film that exhibits good wettability to the polyimide film so as to be efficiently attached to the polyimide film and that can suppress damage to or shape change of a panel including the polyimide film when the protective film is peeled off of the polyimide film.

On the other hand, in the process of manufacturing an optical display, the protective film attached to the polyimide film is cut to a size corresponding to an organic light emitting diode panel. The protective film is removed from the polyimide film after the cutting process. During such a cutting process, there can be a problem of particle scattering or film agglomeration on the cut surface of the protective film, thereby causing deterioration in performance of the panel. Moreover, in order to prevent generation of static electricity upon separation from the polyimide film, the protective film may include an antistatic agent. However, an excess of the antistatic agent can provide an adverse influence on the properties of the protective film. Therefore, there is a need for a protective film that can secure antistatic properties of the antistatic agent even with a small amount thereof.

A lower surface of the panel including organic light emitting diodes may be formed with a polyimide film, whereas an upper surface thereof may be formed with a sealing layer to protect the panel. The sealing layer may include an organic layer and an inorganic layer sequentially stacked such that the inorganic layer is placed at the outermost side to protect the panel from external moisture, gas, and the like. The inorganic layer may be formed of silicon oxide and the like. If the protective film disposed to protect the polyimide film exhibits low peel strength with respect to the inorganic layer, this protective film can be used as the protective film disposed to protect the upper surface of the panel.

One example of the background technique of the present invention is disclosed in Korean Patent Laid-open Publication No. 2007-0055363.

DISCLOSURE

Technical Problem

It is one object of the present invention to provide an adhesive film that exhibits good wettability with respect to a polyimide film and can prevent damage to the polyimide film and/or shape change of the polyimide film upon separation of the adhesive film from the polyimide film after the adhesive film is attached to the polyimide film.

It is another object of the present invention to provide an adhesive film that does not exhibit change of peel strength and can prevent damage to the polyimide film and/or shape change of the polyimide film even after the adhesive film is attached to a polyimide film and left for a long period of time.

It is a further object of the present invention to provide an adhesive film that can prevent particle scattering and/or agglomeration, creep, scattering or breakage of the adhesive film upon cutting the adhesive film attached to a polyimide film.

It is yet another object of the present invention to provide an adhesive film that can improve usability by preventing foreign matter from remaining on an adherend even after the adhesive film is attached to the adherend at high temperature for a long period of time.

It is yet another object of the present invention to provide an adhesive film that can prevent damage to a glass substrate and/or shape change of the glass substrate upon separation of the adhesive film from the glass substrate after the adhesive film is attached to the glass substrate.

It is yet another object of the present invention to provide an adhesive film that allows an antistatic agent to exhibit antistatic performance even with a small amount of the antistatic agent.

It is yet another object of the present invention to provide an adhesive film that can prevent damage to a panel upon separation of the adhesive film from a protective film.

It is yet another object of the present invention to provide an adhesive film that exhibits good residue properties.

It is yet another object of the present invention to provide an adhesive film that has a high curing rate and good compatibility between components thereof.

Technical Solution

In accordance with one aspect of the present invention, an adhesive film may be formed of two or more (meth)acrylic monomers for a (meth)acrylic prepolymer and a silicon-containing (meth)acrylate, and may have a peel strength of about 0.5 gf/in to about 5 gf/in with respect to a polyimide film.

In accordance with another aspect of the present invention, an optical member includes an optical film and the adhesive film according to the present invention formed on at least one surface of the optical film.

Advantageous Effects

The present invention provides an adhesive film that exhibits good wettability with respect to a polyimide film and can prevent damage to the polyimide film and/or shape change of the polyimide film upon separation of the adhesive film from the polyimide film after the adhesive film is attached to the polyimide film.

The present invention provides an adhesive film that does not exhibit change of peel strength and can prevent damage to the polyimide film and/or shape change of the polyimide film even after the adhesive film is attached to a polyimide film and left for a long period of time.

The present invention provides an adhesive film that can prevent particle scattering and/or agglomeration, creep, scattering or breakage of the adhesive film upon cutting the adhesive film attached to a polyimide film.

The present invention provides an adhesive film that can improve usability by preventing foreign matter from remaining on an adherend even after the adhesive film is attached to the adherend at high temperature for a long period of time.

The present invention provides an adhesive film that can prevent damage to a glass substrate and/or shape change of the glass substrate upon separation of the adhesive film from the glass substrate after the adhesive film is attached to the glass substrate.

The present invention provides an adhesive film that allows an antistatic agent to exhibit antistatic performance even with a small amount of the antistatic agent.

The present invention provides an adhesive film that exhibits good residue properties.

The present invention provides an adhesive film that has a high curing rate and good compatibility between components thereof.

BEST MODE

Embodiments of the present invention will be described in detail with reference to the accompanying drawings to provide thorough understanding of the invention to those skilled in the art. It should be understood that the present invention may be embodied in different ways and is not limited to the following embodiments.

Herein, the term "(meth)acryl" may mean acryl and/or methacryl.

Herein, the term "copolymer" may include an oligomer, a polymer or a resin.

Hereinafter, an adhesive film according to one embodiment of the present invention will be described.

The adhesive film according to the embodiment of the present invention (hereinafter, "adhesive film") may be formed of an adhesive composition that includes a monomer mixture including: at least two kinds of (meth)acrylic monomers for a (meth)acrylic prepolymer; and a silicon-containing (meth)acrylate.

The adhesive film may have a peel strength of about 0.5 gf/in to about 5 gf/in with respect to a polyimide film. Within this range, the adhesive film can have good processability upon attachment to the polyimide film, can protect the polyimide film when attached thereto, and can prevent damage and/or shape change of the polyimide film upon separation from the polyimide film. Accordingly, the adhesive film can be used as a protective film for the polyimide film without an additional element. The polyimide film used in measurement of peel strength may be obtained from commercially available products, for example, products manufactured by SKC Kolon PI Co. Ltd. For example, the adhesive film may have a peel strength of about 0.5 gf/in, about 1 gf/in, about 1.5 gf/in, about 2 gf/in, about 2.5 gf/in, about 3 gf/in, about 3.5 gf/in, about 4 gf/in, about 4.5 gf/in, or about 5 gf/in with respect to a polyimide film.

In one embodiment, the adhesive film may have a peel strength change rate of about 10% or less, for example, about 0% to about 10%, as calculated by Equation 1. Within this range, the adhesive film can exhibit a low change rate between room temperature and high temperature to provide good reliability:

$$\text{Peel strength change rate}=(B-A)/A\times 100, \qquad <\text{Equation 1}>$$

where A is an initial peel strength (unit: gf/in) of the adhesive film with respect to a polyimide film; and B is a peel strength (unit: gf/in) of the adhesive film with respect to the polyimide film after the adhesive film is attached to the polyimide film and left at 60° C. for 3 days.

In Equation 1, each of A and B may be about 0 gf/in to about 5 gf/in, for example, greater than about 0 gf/in to about 5 gf/in, or about 0.5 gf/in to about 5 gf/in. Within this range, the adhesive film can exhibit good processability and reworkability.

In one embodiment, the adhesive film may have a transfer peel strength change rate of about 85% or more, for example, about 86% to about 100%, as calculated by Equation 2.

$$\text{Transfer peel strength change rate}=D/C\times 100, \qquad <\text{Equation 2}>$$

where C is a peel strength (unit: gf/in) of an adhesive tape with respect to a glass substrate; and D is a peel strength (unit: gf/in) of the adhesive tape with respect to a portion of the glass substrate from which the adhesive film is removed, after the adhesive film is laminated onto the glass substrate and is left in an oven at 40° C. for 10 days.

Within this range of transfer peel strength change rate, the adhesive film can prevent foreign matter from remaining on an adherend and contaminating the adherend even after the adhesive film is attached to the adherend at high temperature for a long period of time and removed therefrom, thereby improving usability of the adhesive film. Herein, the "adherend" may be a polyimide film or a glass substrate.

Herein, the "transfer peel strength change rate" is a measure of whether a residue of the adhesive film remains on the glass substrate after the adhesive film according to the present invention is attached to the glass substrate and is left in an oven at 40° C. for 10 days. The transfer peel strength change rate is not particularly affected by peel strength of the adhesive tape with respect to the glass substrate, components of the adhesive tape, and the like. For example, an adhesive tape formed of an adhesive composition including a (meth)acrylic copolymer and a heat curing agent (for example, isocyanate-based heat curing agent) may be used as the adhesive tape. The adhesive tape may have a peel strength of about 500 gf/in to about 1,000 gf/in with respect to a glass substrate.

The adhesive film may have a peel strength of about 0.5 gf/in to about 5 gf/in with respect to glass, for example, a glass substrate. Within this range, the adhesive film can be attached to glass (for example: a glass substrate) to protect the glass substrate and can prevent damage to the glass substrate and/or shape change of the glass substrate upon separation of the adhesive film from the glass substrate after the adhesive film is attached thereto. Accordingly, the adhesive film can be used as a protective film for the glass substrate. For example, the adhesive film may have a peel strength of about 0.5 gf/in, about 1 gf/in, about 1.5 gf/in, about 2 gf/in, about 2.5 gf/in, about 3 gf/in, about 3.5 gf/in, about 4 gf/in, about 4.5 gf/in, or about 5 gf/in with respect to the glass substrate.

The adhesive film may have a haze of about 0% to about 2.0%, for example, about 0% to about 1.5%. Within this range, the adhesive film can permit easy cutting upon stacking on a polyimide film and can facilitate management of foreign matter.

The adhesive film may have a glass transition temperature Tg of about −120° C. to about −10° C., or about −70° C. to about −20° C., preferably about −60° C. to about −30° C. Within this range, the adhesive film can have improved wettability.

The adhesive film may have a total light transmittance of about 80% or more, specifically about 85% to about 100%, in the wavelength range of visible light (for example: in the wavelength range of 380 nm to 780 nm). Within this range, the adhesive film can exhibit good optical transparency to be used for an optical display.

The adhesive film may have a thickness of about 10 μm to about 200 μm, preferably about 25 μm to about 75 μm. Within this range, the adhesive film can be stacked on an optical film in use.

The adhesive film may be formed of an adhesive composition including a monomer mixture for a (meth)acrylic prepolymer; and an initiator, wherein the monomer mixture includes at least two kinds of (meth)acrylic monomers for a (meth)acrylic prepolymer and a silicon-containing (meth)acrylate. In the adhesive composition, the monomer mixture may be present in a completely non-polymerized state. Alternatively, in the adhesive composition, the monomer mixture may be present as a prepolymer obtained through partial polymerization of the monomer mixture. In this alternative embodiment, the adhesive composition may include the remaining monomer mixture not partially polymerized into a prepolymer.

In one embodiment, the adhesive composition may include a prepolymer of the monomer mixture including the at least two kinds of (meth)acrylic monomers for the (meth)acrylic prepolymer and the silicon-containing (meth)acrylate; and an initiator.

In one embodiment, the monomer mixture may form a hydroxyl group-containing (meth)acrylic copolymer or a hydroxyl group-containing (meth)acrylic prepolymer. The hydroxyl group-containing (meth)acrylic copolymer or the hydroxyl group-containing (meth)acrylic prepolymer forms a matrix of the adhesive film while exhibiting adhesion. The hydroxyl group-containing (meth)acrylic copolymer or the hydroxyl group-containing (meth)acrylic prepolymer may have a glass transition temperature of about −60° C. to about −20° C., specifically about −50° C. to about −20° C. Within this range, the adhesive film can exhibit improved wettability.

In one embodiment, the at least two kinds of (meth)acrylic monomers for the (meth)acrylic prepolymer may include a hydroxyl group-containing (meth)acrylate and an alkyl group-containing (meth)acrylate.

The hydroxyl group-containing (meth)acrylate can impart peel strength to the adhesive film. The hydroxyl group-containing (meth)acrylate may be a (meth)acrylate containing at least one hydroxyl group. In one embodiment, the hydroxyl group-containing (meth)acrylate may be a non-silicon based (meth)acrylate free from silicon. For example, the hydroxyl group-containing (meth)acrylate may include at least one of 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethyleneglycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl (meth)acrylate, 4-hydroxycyclohexyl (meth)acrylate, and cyclohexanedimethanol mono(meth)acrylate. Preferably, the hydroxyl group-containing (meth)acrylate may include at least one of 2-hydroxyethyl (meth)acrylate, 4-hydroxybutyl (meth)acrylate, and 2- or 3-hydroxypropyl (meth)acrylate.

In the monomer mixture, the hydroxyl group-containing (meth)acrylate may be present in an amount of about 0.1% by weight (wt %) to about 60 wt %, for example, 0.1 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %, about 0.1 to 20 wt %, or about 1 wt % to about 15 wt %, preferably about 1 wt % to about 10 wt %, or about 1 wt % to about 5 wt %. Within this range, the adhesive film can have a peel strength of about 0.5 gf/in to about 5 gf/in with respect to a polyimide film. Specifically, the adhesive film can have a peel strength of about 0.5 gf/in to about 5 gf/in with respect to a polyimide film even after the adhesive film is left under high temperature/high humidity conditions. The adhesive film can secure a low haze variation rate to provide good reliability, even after the adhesive film is left under high temperature/high humidity conditions.

The alkyl group-containing (meth)acrylate can form a matrix of the adhesive film. The alkyl group-containing (meth)acrylate may include a (meth)acrylic acid ester having an unsubstituted $C_1$ to $C_{20}$ linear or branched alkyl group. In one embodiment, the alkyl group-containing (meth)acrylate may be a non-silicon based (meth)acrylate free from silicon. In one embodiment, the alkyl group-containing (meth)acrylate may be a non-cyclic (meth)acrylate free from a cyclic functional group. For example, the alkyl group-containing (meth)acrylate may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, lauryl (meth)acrylate, and ethylhexyl diglycol (meth)acrylate.

In one embodiment, the alkyl group-containing (meth)acrylate may have a glass transition temperature of about −80° C. to about −40° C., preferably about −80° C. to about −50° C., in a homopolymer phase. Within this range, the adhesive film can exhibit improved wettability. For example, the alkyl group-containing (meth)acrylate may include at least one of 2-ethylhexyl acrylate, iso-octyl acrylate, and ethylhexyl diglycol acrylate.

In the monomer mixture, the alkyl group-containing (meth)acrylate may be present in an amount of about 5 wt % to about 99.9 wt %, for example, about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 99.9 wt %, preferably about 5 wt % to about 80 wt %, about 6 wt % to about 80 wt %, about 10 wt % to about 90 wt %, about 50 wt % to about 99 wt %, about 50 wt % to about 95 wt %, or about 65 wt % to about 98 wt %. Within this range, the alkyl group-containing (meth)acrylate can improve mechanical strength of the adhesive film while securing high reliability between room temperature and high temperature.

In the monomer mixture, the alkyl group-containing (meth)acrylate and the hydroxyl group-containing (meth)acrylate may be present in a total amount of about 10 wt % to about 99 wt %, for example, about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, or 99 wt %, preferably about 10 wt % to about 94 wt %, or about 20 wt % to about 94 wt %. Within this range, the adhesive film can have good gap filling performance, good flexibility, and good reliability under high temperature or high temperature/high humidity conditions.

The silicon-containing (meth)acrylate can reduce peel strength of the adhesive film with respect to the polyimide film. Preferably, the silicon-containing (meth)acrylate may be a siloxane-modified monofunctional (meth)acrylate. The siloxane-modified monofunctional (meth)acrylate may include a compound in which an ester moiety of the monofunctional (meth)acrylate is modified with siloxane.

Preferably, the siloxane-modified monofunctional (meth)acrylate is a monofunctional (meth)acrylate having an alkyl siloxane-containing alkyl group or a monofunctional (meth)acrylate having an alkyl siloxane-containing aryl group, more preferably a monofunctional (meth)acrylate having an alkyl siloxane-containing alkyl group.

In one embodiment, the silicon-containing (meth)acrylate may be represented by Formula 1:

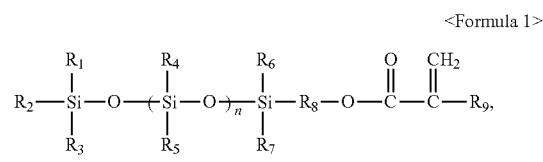

<Formula 1> wherein $R_1$, $R_2$, $R_3$, $R_4$, $R_5$, $R_6$, and $R_7$ are each independently a hydrogen, a $C_1$ to $C_{10}$ alkyl group, a $C_3$ to $C_{10}$ cycloalkyl group, or a $C_6$ to $C_{10}$ aryl group; Rx is a $C_1$ to $C_{10}$ alkylene group or a $C_6$ to $C_{10}$ arylene group; $R_9$ is a hydrogen or a methyl group; and n is an integer of 10 to 100.

Preferably, $R_1$, $R_2$, $R_3$, $R_4$, $R_5$, $R_6$, and $R_7$ are each independently a $C_1$ to $C_{10}$ alkyl group, more preferably a $C_1$ to $C_5$ alkyl group, for example, a methyl group, an ethyl group, a propyl group, a butyl group, or a pentyl group. Preferably, $R_8$ is a $C_1$ to $C_5$ alkylene group, more preferably a methylene group, an ethylene group, a propylene group, a butylene group, or a pentylene group. For example, n may be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. Preferably, n is an integer of about 20 to about 80, more preferably an integer of about 25 to about 60.

In one embodiment, the silicon-containing (meth)acrylate may be represented by Formula 1-1:

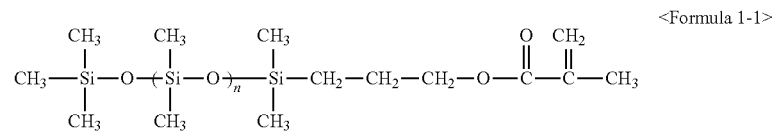

<Formula 1-1> wherein n is an integer of 10 to 100.

The silicon-containing (meth)acrylate may have a number average molecular weight of about 1,000 to about 6,000, preferably about 2,000 to about 6,000, or about 3,000 to about 6,000.

In the monomer mixture, the silicon-containing (meth) acrylate may be present in an amount of about 0.5 wt % to about 80 wt %, for example, about 0.5 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 555 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %, specifically about 6 wt % to about 80 wt %, or about 0.5 wt % to about 15 wt %. Within this range, the adhesive film can have good gap filling performance, good flexibility, and good reliability under high temperature or high temperature/high humidity conditions. In addition, the adhesive film can have a peel strength of about 0.5 gf/in to about 5 gf/in with respect to the polyimide film and good surface properties including scattering properties upon cutting.

In one embodiment, the adhesive film includes the hydroxyl group-containing (meth)acrylic copolymer, which may not include a photoreactive group at a side chain thereof. The photoreactive group may be a (meth)acrylate group or a vinyl group.

The hydroxyl group-containing (meth)acrylic copolymer may have a weight average molecular weight of greater than about 0 to about 4,000,000, preferably about 1,000,000 to about 3,000,000, more preferably about 1,500,000 to about 3,000,000. Within this range, the adhesive film can have good mechanical strength and can permit adjustment of peel strength with respect to the polyimide film.

The monomer mixture may further include a copolymerizable monomer.

The copolymerizable monomer is included in the (meth)acrylic copolymer to provide additional effects to the (meth)acrylic copolymer, the adhesive composition or the adhesive film. The copolymerizable monomer is a different monomer from the hydroxyl group-containing (meth)acrylate and the alkyl group-containing (meth)acrylate, and may include a non-silicon based monomer free from silicon. For example, the copolymerizable monomer may include at least one of an ethylene oxide-containing monomer, a propylene oxide-containing monomer, an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing (meth)acrylate.

The ethylene oxide-containing monomer may include at least one (meth)acrylate-based monomer containing an ethylene oxide group ($-CH_2CH_2O-$). For example, the ethylene oxide-containing monomer may include polyethylene oxide alkyl ether(meth)acrylates, such as polyethylene oxide monomethyl ether(meth)acrylate, polyethylene oxide monoethyl ether(meth)acrylate, polyethylene oxide monopropyl ether(meth)acrylate, polyethylene oxide monobutyl ether (meth)acrylate, polyethylene oxide monopentyl ether(meth)acrylate, polyethylene oxide dimethyl ether(meth)acrylate, polyethylene oxide diethyl ether(meth)acrylate, polyethylene oxide monoisopropyl ether(meth)acrylate, polyethylene oxide monoisobutyl ether(meth)acrylate, and polyethylene oxide mono-tert-butyl ether(meth)acrylate, without being limited thereto.

The propylene oxide-containing monomer may include polypropylene oxide alkyl ether (meth)acrylates, such as polypropylene oxide monomethyl ether(meth)acrylate, polypropylene oxide monoethyl ether(meth)acrylate, polypropylene oxide monopropyl ether(meth)acrylate, polypropylene oxide monobutyl ether(meth)acrylate, polypropylene oxide monopentyl ether(meth)acrylate, polypropylene oxide dimethyl ether(meth)acrylate, polypropylene oxide diethyl ether(meth)acrylate, polypropylene oxide monoisopropyl ether(meth)acrylate, polypropylene oxide monoisobutyl ether(meth)acrylate, and polypropylene oxide mono-tert-butyl ether(meth)acrylate, without being limited thereto.

The amine group-containing monomer may include amine group-containing acrylate monomers, such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and methacryloxyethyltrimethyl ammonium chloride (meth)acrylate, without being limited thereto.

The alkoxy group-containing monomer may include 2-methoxy ethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and 3-butoxyhexyl (meth)acrylate, without being limited thereto.

The phosphoric acid group-containing monomer may include phosphoric acid group-containing acrylic monomers, such as 2-methacryloyloxyethyldiphenylphosphate (meth)acrylate, trimethacryloyloxyethylphosphate (meth)acrylate, and triacryloyloxyethylphosphate (meth)acrylate, without being limited thereto.

The sulfonic acid group-containing monomer may include sulfonic acid group-containing acrylic monomers, such as sodium sulfopropyl (meth)acrylate, sodium 2-sulfoethyl (meth)acrylate, and sodium 2-acrylamido-2-methylpropane sulfonate, without being limited thereto.

The phenyl group-containing monomer may include phenyl group-containing acrylic vinyl monomers, such as p-tert-butylphenyl (meth)acrylate, o-biphenyl (meth)acrylate, and phenoxyethyl (meth)acrylate, without being limited thereto.

The silane group-containing monomer may include silane group-containing vinyl monomers, such as 2-acetoacetoxyethyl (meth)acrylate, vinyltrimethoxysilane, vinyltriethoxysilane, vinyl tris(2-methoxyethyl)silane, vinyltriacetoxysilane, and (meth)acryloyloxypropyltrimethoxysilane, without being limited thereto.

The carboxylic acid group-containing monomer may include (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and maleic anhydride, without being limited thereto.

The amide group-containing (meth)acrylate may include at least one of (meth)acrylamide, N-methyl (meth)acrylamide, N-methylol (meth)acrylamide, N-methoxymethyl (meth)acrylamide, N,N-methylene bis(meth)acrylamide, N-hydroxyethyl (meth)acrylamide, and N,N-diethyl (meth)acrylamide, without being limited thereto. In particular, N-hydroxyethyl (meth)acrylamide and N,N-diethyl (meth)acrylamide can efficiently exhibit the effects of the present invention and can have good compatibility with the alkyl group-containing (meth)acrylate and the hydroxyl group-containing (meth)acrylate.

In the monomer mixture, the copolymerizable monomer may be present in an amount of about 0 wt % to about 30 wt % or less, specifically about 0 wt % to about 20 wt % or less, more specifically about 1 wt % to about 15 wt %. Within this range, the adhesive composition can further improve adhesive strength and durability of the adhesive film.

The initiator may be used to form an acrylic copolymer by curing (partially polymerizing) the monomer mixture, or to cure a viscous liquid (adhesive composition) into a film. The initiator may include at least one of a photopolymerization initiator and a thermal polymerization initiator.

The photopolymerization initiator may be any initiator so long as the initiator can induce polymerization of a radical polymerizable compound during curing through light irradiation. For example, the photopolymerization initiator may include benzoin, hydroxy ketone, amino ketone, phosphine oxide photoinitiators, and the like. Specifically, the photopolymerization initiator may include benzoin, benzoin methyl ether, benzoin ethyl ether, benzoin isopropyl ether, benzoin n-butyl ether, benzoin isobutyl ether, acetophenone compounds such as 2,2-dimethoxy-2-phenylacetophenone, 2,2'-diethoxyacetophenone, 2,2'-dibutoxyacetophenone, 2-hydroxy-2-methylpropiophenone, p-t-butyltrichloroacetophenone, p-t-butyl dichloroacetophenone, 4-chloroacetophenone, 2,2'-dichloro-4-phenoxyacetophenone, dimethylaminoacetophenone, 2,2-dimethoxy-2-phenylacetophenone, and 2,2-diethoxy-2-phenylacetophenone, 2-hydroxy-2-methyl-1-phenylpropan-1-one, 2-benzyl-2-dimethyl amino-1-(4-morpholinophenyl)-butane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof.

The thermal polymerization initiator may be any typical initiator, for example, azo, peroxide and redox compounds, so long as the initiator can realize the above properties. Examples of the azo compound may include 2,2-azobis(2-methylbutyronitrile), 2,2-trilazobis(isobutyronitrile), 2,2-trilazobis(2,4-dimethylvaleronitrile), 2,2-nitazobis-2-hydroxymethylpropionitrile, dimethyl-2,2-methylazobis(2-methylpropionate), and 2,2-pioazobis(4-methoxy-2,4-dimethylvaleronitrile), without being limited thereto. Examples of the peroxide compound may include: inorganic peroxides such as potassium perchlorate, ammonium persulfate, and hydrogen peroxide; and organic peroxides such as diacetylperoxide, peroxy dicarbonate, peroxy ester, tetramethylbutyl peroxy neodecanoate, bis(4-butylcyclohexyl)peroxydicarbonate, di(2-ethylhexyl)peroxy carbonate, butyl peroxy neodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butylperoxy neoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, and dibenzoyl peroxide, without being limited thereto. Examples of the redox compound may include mixtures of a peroxide compound and a reductant, without being limited thereto. These azo, peroxide and redox compounds may be used alone or in combination thereof.

The initiator may be present in an amount of about 0.0001 parts by weight to about 5 parts by weight, specifically about 0.001 parts by weight to about 3 parts by weight, more specifically about 0.001 parts by weight to about 1 part by weight, relative to 100 parts by weight of the monomer mixture. Within this range, the initiator allows complete curing of the adhesive composition, can prevent deterioration in transmittance of the adhesive film due to residual initiator, can reduce bubble generation, and can exhibit good reactivity.

The adhesive composition may optionally further include typical additives, such as antistatic agents, surfactants, curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), processing agents, UV blocking agents, fluorescent whitening agents, dispersants, heat stabilizers, photostabilizers, UV absorbers, coagulants, lubricants, solvents, and the like.

In one embodiment, the antistatic agent may include an anion and a cation. Herein, the anion may be a fluoro organic anion. For example, the fluoro organic anion may include anions represented by Formula 2, 3, or 4:

$$RSO_3^{\ominus} \qquad \text{<Formula 2>}$$

<Formula 3>

<Formula 4>

In Formulae 2 to 4, each R is independently fluorinated alkyl, fluorinated cycloalkyl or fluorinated aryl, the fluorinated alkyl, the fluorinated cycloalkyl and the fluorinated aryl containing a hetero-atom in a chain or at a terminal thereof;

Q is independently $SO_2$ or CO;

Y is selected from QR, CN, a halogen atom, H, alkyl, aryl, Q-alkyl and Q-aryl (Q is independently $SO_2$ or CO; and R is fluorinated alkyl, fluorinated cycloalkyl or fluorinated aryl, the fluorinated alkyl, the fluorinated cycloalkyl and the fluorinated aryl containing a hetero-atom in a chain or at a terminal thereof; and two adjacent R groups are linked to each other to form a ring.

The hetero-atom may be, for example, N, O or S (for example, $—SF_4—$ or $—SF_5$). Preferably, the antistatic agent is a compound represented by Formula 2 or Formula 3. R is a perfluoro alkyl group, Q is $SO_2$, and each Y is QR.

In Formulae 2 to 4, "alkyl" means a $C_1$ to $C_{10}$ alkyl group, "cycloalkyl" means a $C_3$ to $C_{10}$ cycloalkyl group, and "aryl" means a $C_6$ to $C_{10}$ aryl group.

The cation may include an alkali metal cation such as lithium, alkyl ammonium, and the like.

When the adhesive film is formed of the adhesive composition including the antistatic agent, the adhesive film may have a surface resistance of greater than about $0\Omega/\square$ to about $1\times10^{10}\Omega/\square$, for example, greater than about $0\Omega/\square$ to about 6.5×10$^9$Ω/□. In particular, the adhesive film according to the present invention is used for the purpose of peeling off the polyimide film after being attached thereto. Thus, when the antistatic agent is included in the same amount, the antistatic agent can reduce surface resistance and can prevent damage to a panel due to static electricity in a process.

The surfactant may include a silicone-based surfactant. For example, the surfactant may be selected from BYK-3500 products.

The additives may be present in an amount of about 0.001 parts by weight to about 1 part by weight, specifically about 0.003 parts by weight to about 1 part by weight, specifically about 0.005 parts by weight to about 1 part by weight, relative to 100 parts by weight of the monomer mixture for the (meth)acrylic prepolymer. Within this range, the additive can secure inherent effects thereof without affecting peel strength and reliability of the adhesive film.

The adhesive composition may have a viscosity of about 300 cP to about 20,000 cP at 25° C. Within this viscosity range, the adhesive composition can have good coatability and thickness uniformity.

The adhesive composition does not include a heat curing agent (for example, isocyanate-based type heat curing agent). The adhesive composition can secure peel strength with respect to the polyimide film with the above components of the adhesive film without the heat curing agent.

The adhesive composition may be prepared through partial polymerization of the monomer mixture with an initiator, followed by adding at least one of an additional initiator, an additional cross-linking agent, and an additional additive. Alternatively, the adhesive composition may be prepared by partially polymerizing a mixture including the monomer mixture for the (meth)acrylic prepolymer and the initiator, followed by adding an additional initiator. The crosslinking agent and the additives described above may be further added to the mixture. Partial polymerization may include solution polymerization, suspension polymerization, photopolymerization, bulk polymerization, or emulsion polymerization. Specifically, solution polymerization may be performed at about 50° C. to about 100° C. by adding an initiator to the monomer mixture. The initiator may include a photopolymerization initiator, such as an acetophenone compound including 2,2-dimethoxy-2-phenylacetophenone, 1-hydroxycyclohexylphenylketone, and the like, without being limited thereto. Partial polymerization may be performed to achieve a viscosity at 25° C. of about 1,000 cP to about 10,000 cP, specifically about 4,000 cP to about 9,000 cP.

The adhesive film may be produced by a typical method. For example, the adhesive film may be produced by coating the adhesive composition onto a release film, followed by curing. Curing may be performed under a low-pressure lamp at a wavelength of about 300 nm to about 400 nm and a dose of about 400 m/cm$^2$ to about 3,000 mJ/cm$^2$ in an oxygen-free state.

Next, an adhesive film according to another embodiment of the present invention will be described.

The adhesive film is formed of an adhesive composition that includes: a monomer mixture including at least two kinds of (meth)acrylic monomers for a (meth)acrylic prepolymer and a silicon-containing (meth)acrylate; and a crosslinking agent, and may have a peel strength of about 0.5 gf/in to about 5 gf/in with respect to a polyimide film. The adhesive film according to this embodiment is substantially the same as the adhesive film according to the above embodiment except that the adhesive film according to this embodiment is formed of the adhesive composition further including the crosslinking agent.

In one embodiment, the adhesive composition may include a prepolymer of a monomer mixture including at least two kinds of (meth)acrylic monomers for a (meth)acrylic prepolymer and a silicon-containing (meth)acrylate; and a crosslinking agent.

The crosslinking agent can increase mechanical strength of the adhesive film through improvement in crosslinking degree of the adhesive composition. Accordingly, the crosslinking agent can regulate peel strength of the adhesive film. Thus, the adhesive film has a glass transition temperature of about −65° C. or more, preferably about −65° C. to about −40° C. Within this range of glass transition temperature, the adhesive film can maintain wettability while protecting the polyimide film from external impact when attached to the polyimide film.

The crosslinking agent may include a polyfunctional (meth)acrylate capable of being cured by actinic radiation. In one embodiment, the crosslinking agent may include a non-silicon based polyfunctional (meth)acrylate free from silicon. For example, the crosslinking agent may include bifunctional (meth)acrylates, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-bis[4-(2-acryloyloxyethoxy)phenyl]fluorene; trifunctional acrylates, such as trimethyolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and tris(meth)acryloxyethyl isocyanurate; tetrafunctional acrylates, such as diglycerin tetra(meth)acrylate and pentaerythritol tetra(meth)acrylate; pentafunctional acrylates, such as dipentaerythritol penta(meth)acrylate; and hexafunctional acrylates such as dipentaerythritol hexa(meth)acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto. These may be used alone or as a mixture thereof. Preferably, the crosslinking agent may be a polyfunctional (meth)acrylate of polyhydric alcohol.

The crosslinking agent may be present in an amount of about 0.5 parts by weight or more, for example, about 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, specifically about 0.5 parts by weight to about 30 parts by weight, preferably about 0.5 parts by weight to about 20 parts by weight, specifically about 5 parts by weight to about 20 parts by weight, relative to 100 parts by weight of the monomer mixture. Within this range, the adhesive film can secure good mechanical strength and improved reliability.

Next, an adhesive film according to a further embodiment of the present invention will be described.

The adhesive film according to this embodiment is formed of an adhesive composition that includes a monomer mixture including at least two kinds of (meth)acrylic monomers for a (meth)acrylic prepolymer, a silicon-containing (meth) acrylate, and a cyclic functional group-containing (meth) acrylic monomer. The adhesive film may have a peel strength of about 0.5 gf/in to about 5 gf/in with respect to a polyimide film. The adhesive film according to this embodiment is substantially the same as the adhesive film according to the above embodiment except that the adhesive film according to this embodiment is formed of the adhesive composition further including the cyclic functional group-containing (meth)acrylic monomer. Here, it should be noted that the "at least two kinds of (meth)acrylic monomers for the (meth)acrylic prepolymer" is different from the "cyclic functional group-containing (meth)acrylic monomer".

In one embodiment, the adhesive composition may include a prepolymer of the monomer mixture including at least two kinds of (meth)acrylic monomers for the (meth) acrylic prepolymer, a silicon-containing (meth)acrylate, and a cyclic functional group-containing (meth)acrylic monomer.

The cyclic functional group-containing (meth)acrylic monomer allows the adhesive film to exhibit soft properties, thereby improving scattering properties of the adhesive film upon cutting the adhesive film attached to the polyimide film. In addition, since a polyimide constituting the polyimide film has a cyclic structure, the cyclic functional group-containing (meth)acrylic monomer allows the adhesive film to exhibit affinity with respect to the polyimide film, thereby further improving wettability of the adhesive film when the adhesive film is attached to the polyimide film.

The cyclic functional group-containing (meth)acrylic monomer is a non-silicon based (meth)acrylic monomer and may include at least one of an alicyclic group-containing (meth)acrylate and a hetero-alicyclic group-containing (meth)acrylic monomer. In one embodiment, the cyclic functional group-containing (meth)acrylic monomer may be a monofunctional (meth)acrylic monomer.

The alicyclic group-containing (meth)acrylate may include a $C_3$ to $C_{15}$ alicyclic group-containing (meth)acrylate. Preferably, the alicyclic group-containing (meth)acrylate includes a $C_9$ to $C_{15}$ alicyclic group. For example, the alicyclic group-containing (meth)acrylate may include at least one of isobornyl acrylate, isobornyl methacrylate, dihydrodicyclopentadienyl acrylate, cyclohexyl acrylate, and cyclohexyl methacrylate. The hetero-alicyclic group-containing (meth)acrylic monomer may include a $C_3$ to $C_{15}$ hetero-alicyclic group-containing (meth)acrylic monomer having at least one of oxygen, nitrogen and sulfur. For example, the hetero-alicyclic group-containing (meth) acrylic monomer may include at least one of acryloylmorpholine and methacryloylmorpholine.

In one embodiment, the cyclic functional group-containing (meth)acrylic monomer may have a glass transition temperature of about 50° C. to about 130° C., preferably about 70° C. to about 120° C., in a homopolymer phase. Within this range of glass transition temperature, it is possible to suppress the glass transition temperature of the film.

The cyclic functional group-containing (meth)acrylic monomer may be present in an amount of about 1 wt % to about 10 wt %, for example, about 1 wt %, 2 wt %, 3 wt %, 4 wt %, 5 wt %, 6 wt %, 7 wt %, 8 wt %, 9 wt %, or 10 wt %, in the monomer mixture. Within this range, the cyclic functional group-containing (meth)acrylic monomer can improve scattering properties upon cutting and wettability of the adhesive film with respect to the polyimide film, and can prevent increase in peel strength of the adhesive film with respect to the polyimide film.

Next, an adhesive film according to yet another embodiment of the present invention will be described.

The adhesive film according to this embodiment is formed of an adhesive composition that includes: a monomer mixture including at least two kinds of (meth)acrylic monomers for a (meth)acrylic prepolymer, a silicon-containing (meth) acrylate and a cyclic functional group-containing (meth) acrylic monomer; and a crosslinking agent. The adhesive film may have a peel strength of about 0.5 gf/in to about 5 gf/in with respect to a polyimide film. This is the same as described above.

In one embodiment, the adhesive composition may include a prepolymer of a monomer mixture including at least two kinds of (meth)acrylic monomers for a (meth) acrylic prepolymer, a silicon-containing (meth)acrylate and a cyclic functional group-containing (meth)acrylic monomer; and a crosslinking agent.

Next, an adhesive film according to yet another embodiment of the present invention will be described.

The adhesive film according to this embodiment is formed of an adhesive composition that includes: at least two kinds of (meth)acrylic monomers for a (meth)acrylic prepolymer, a siloxane-modified monofunctional (meth)acrylate, and a siloxane-modified bifunctional (meth)acrylate, in which the siloxane-modified monofunctional (meth)acrylate and the siloxane-modified bifunctional (meth)acrylate are present in a total amount of about 3 wt % to about 40 wt % in the total amount of the at least two kinds of (meth)acrylic monomers for the (meth)acrylic prepolymer, the siloxane-modified monofunctional (meth)acrylate and the siloxane-modified bifunctional (meth)acrylate. Within this range, the adhesive film can have low peel strength with respect to a polyimide film and/or a glass substrate, and can exhibit good residue properties, high curing rate, good compatibility between components of the adhesive film, good surface properties upon cutting, and good residue properties.

The adhesive film may have a peel strength of about 0.5 gf/in to about 3.5 gf/in, for example, about 2 gf/in to about 3.5 gf/in, with respect to a polyimide film. The adhesive film may have a peel strength of about 0.5 gf/in to about 3 gf/in, for example, about 2 gf/in to about 3 gf/in, with respect to glass (for example, glass substrate). Within this range, even after the adhesive film is attached to the polyimide film or the glass substrate and then removed therefrom, the adhesive film exhibits low peel strength to prevent damage to the polyimide film and/or shape change of the polyimide film. The polyimide film used in measurement of peel strength may be obtained from products manufactured by Kolon Co., Ltd.

As used herein, "good residue properties" means that components of the adhesive film do not remain on the polyimide film after the adhesive film is attached to the polyimide film and is left at high temperature for a long period of time. The adhesive film may have a residue ratio of about 0% to about 25%, as calculated by the following Equation 3. Within this range, since the components of the adhesive film do not remain on the polyimide film upon removal of the adhesive film from the polyimide film, other film members can be efficiently attached to the polyimide film, thereby providing good processability.

$$\text{Residue ratio} = |B-A|/A \times 100 \qquad \text{<Equation 3>}$$

where A is a peel strength (unit: gf/in) of an adhesive tape with respect to a glass substrate; and B is a peel strength (unit: gf/in) of the adhesive tape with respect to a portion of the glass substrate from which the adhesive film is removed, after the adhesive film is laminated onto the glass substrate and is left at 50° C. for 10 days.

As the adhesive tape, an adhesive tape having a peel strength of about 500 gf/in to about 600 gf/in with respect to a glass substrate may be used. For example, the "adhesive tape" may refer to a self-produced adhesive tape (for example: an adhesive tape formed of an adhesive composition including a (meth)acrylic adhesive resin), without being limited thereto. Herein, "being left at 50° C. for 10 days" may be carried out in an oven, without being limited thereto.

The adhesive film may have a weight change ratio of about 0% to about 2%, as calculated by Equation 4. Within this range, the adhesive film can have good compatibility between components thereof and has a high curing rate to be used as a protective film for a polyimide film and/or a glass substrate.

Weight change ratio=|F−E|/E×100    <Equation 4> where E is an initial weight (unit: g) of the adhesive film; and

F is the weight (unit: g) of the adhesive film after the adhesive film is left at 150° C. for 90 minutes and left at 25 for 15 minutes. The "initial weight of the adhesive film" refers to the weight of the adhesive film before the adhesive film is left at 150° C. for 90 minutes and left at 25° for 15 minutes.

The siloxane-modified monofunctional (meth)acrylate may include a compound in which an ester moiety of a monofunctional (meth)acrylate is modified with siloxane. The siloxane-modified monofunctional (meth)acrylate is a monofunctional (meth)acrylate. These may be included alone or as a mixture thereof in the adhesive film.

In one embodiment, the siloxane-modified monofunctional (meth)acrylate may be represented by the Formula 1.

In one embodiment, the siloxane-modified monofunctional (meth)acrylate may be represented by the Formula 1-1.

The siloxane-modified monofunctional (meth)acrylate may be present in an amount of about 0.5 wt % to about 15 wt % based on the total amount of the at least two kinds of (meth)acrylic monomers for the (meth)acrylic prepolymer, the siloxane-modified monofunctional (meth)acrylate and the siloxane-modified bifunctional (meth)acrylate. Within this range, the adhesive film can exhibit low adhesive strength and good residue properties. For example, siloxane-modified monofunctional (meth)acrylate may be present in an amount of about 0.5 wt %, 1 wt %, 2 wt %, 3 wt %, 4 wt %, 5 wt %, 6 wt %, 7 wt %, 8 wt % %, 9 wt %, 10 wt %, 11 wt %, 12 wt %, 13 wt %, 14 wt %, or 15 wt %.

The siloxane-modified bifunctional (meth)acrylate may include a compound in which an ester moiety of a bifunctional (meth)acrylate is modified with siloxane. The siloxane-modified bifunctional (meth)acrylate is a bifunctional (meth)acrylate. These may be included alone or as a mixture thereof in the adhesive film.

In one embodiment, the siloxane-modified bifunctional (meth)acrylate may be represented by Formula 5:

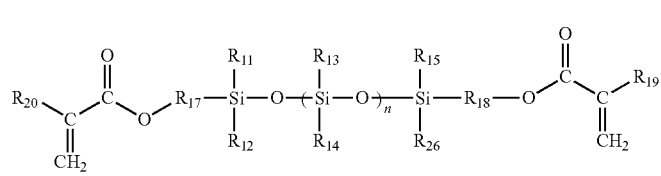
<Formula 5> where $R_{11}$, $R_{12}$, $R_{13}$, $R_{14}$, $R_{15}$, and $R_{16}$ are each independently a hydrogen, a $C_1$ to $C_{10}$ alkyl group, a $C_3$ to $C_{10}$ cycloalkyl group, or a $C_6$ to $C_{10}$ aryl group; $R_{17}$ and $R_{18}$ are each independently a $C_1$ to $C_{10}$ alkylene group or a $C_6$ to $C_{10}$ arylene group; $R_{19}$ and $R_{20}$ are each independently a hydrogen or a methyl group; and n is an integer of 10 to 100.

Preferably, $R_{11}$, $R_{12}$, $R_{13}$, $R_{14}$, $R_{15}$, and $R_{16}$ are each independently a $C_1$ to $C_{10}$ alkyl group, more preferably a $C_1$ to $C_5$ alkyl group, for example, a methyl group, an ethyl group, a propyl group, a butyl group, or a pentyl group. Preferably, $R_{17}$ and $R_{18}$ are each independently a $C_1$ to $C_5$ alkylene group, more preferably a methylene group, an ethylene group, a propylene group, a butylene group, or a pentylene group. Preferably, n is an integer of 20 to 80, more preferably an integer of 20 to 60.

In one embodiment, the siloxane-modified bifunctional (meth)acrylate may be represented by Formula 5-1:

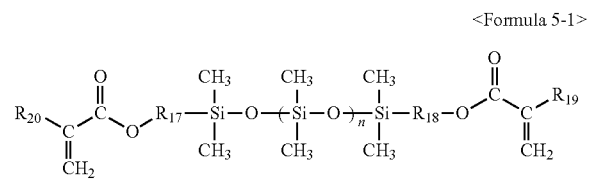
<Formula 5-1> where $R_{17}$ and $R_{18}$ are each independently a $C_1$ to $C_{10}$ alkylene group; $R_{19}$ and $R_{20}$ are each independently a hydrogen or a methyl group; and n is an integer of 10 to 100.

The siloxane-modified bifunctional (meth)acrylate may have a number average molecular weight of about 1,000 to about 6,000, preferably about 1,000 to about 5,000. The siloxane-modified bifunctional (meth)acrylate may have a glass transition temperature of about −150° C. to about −10° C., preferably about −100° C. to about −20° C., in a homopolymer phase. Within this range, the adhesive film can exhibit good properties in terms of wettability and adhesion with respect to an adherend.

The siloxane-modified bifunctional (meth)acrylate may be present in an amount of about 2 wt % to about 25 wt %, for example, about 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, preferably about 2.5 wt % to about 25 wt %, based on the total amount of the at least two kinds of (meth)acrylic monomers for the (meth)acrylic prepolymer, the siloxane-modified monofunctional (meth)acrylate and the siloxane-modified bifunctional (meth)acrylate. Within this range, the adhesive film can exhibit low adhesive strength and good residue properties.

In one embodiment, the at least two kinds of (meth)acrylic monomers for the (meth)acrylic prepolymer may include an alkyl group-containing (meth)acrylate and a hydroxyl group-containing (meth)acrylate. These may be used alone or as a mixture thereof. The (meth)acrylic monomer may be a non-silicon based (meth)acrylate free from silicon. The alkyl group-containing (meth)acrylate and the hydroxyl group-containing (meth)acrylate are the same as those described above.

The alkyl group-containing (meth)acrylate may be present in an amount of about 40 wt % to about 99.9 wt %, preferably about 50 wt % to about 99 wt %, about 50 wt % to about 95 wt %, or about 65 wt % to about 98 wt %, in the monomer mixture for the (meth)acrylic prepolymer. Within this range, the adhesive film can exhibit low peel strength with respect to a polyimide film and low haze variation rate, thereby securing good reliability.

The hydroxyl group-containing (meth)acrylate may be present in an amount of about 0.1 wt % to about 60 wt %, preferably about 0.1 wt % to about 20 wt %, in the monomer mixture for the (meth)acrylic prepolymer. Within this range, the adhesive film can exhibit low peel strength with respect to a polyimide film and low haze variation rate, thereby securing good reliability.

In another embodiment, the at least two kinds of (meth)acrylic monomers for the (meth)acrylic prepolymer may further include a copolymerizable (meth)acrylic monomer in addition to the alkyl group-containing (meth)acrylate and the hydroxyl group-containing (meth)acrylate. The copolymerizable (meth)acrylic monomer is a non-silicon based monomer free from silicon and may include at least one of an alicyclic group-containing (meth)acrylate, a hetero-alicyclic group-containing (meth)acrylate, an aromatic group-containing (meth)acrylate, and a carboxylic acid group-containing (meth)acrylic monomer, without being limited thereto. The alicyclic group-containing (meth)acrylate, hetero-alicyclic group-containing (meth)acrylate, the aromatic group-containing (meth)acrylate, and the carboxylic acid group-containing (meth)acrylic monomer are the same as those described above.

The adhesive film may be formed of the adhesive composition that includes the at least two kinds of (meth)acrylic monomers for the (meth)acrylic prepolymer, the siloxane-modified monofunctional (meth)acrylate, and the siloxane-modified bifunctional (meth)acrylate.

In a first embodiment, the adhesive film may be formed of an adhesive composition that includes: a monomer mixture for a (meth)acrylic prepolymer including at least two kinds of (meth)acrylic monomers and a siloxane-modified monofunctional (meth)acrylate; and a siloxane-modified bifunctional (meth)acrylate. The siloxane-modified monofunctional (meth)acrylate forms the (meth)acrylic prepolymer through partial polymerization. The siloxane-modified bifunctional (meth)acrylate is added after preparation of the (meth)acrylic prepolymer.

The siloxane-modified monofunctional (meth)acrylate and the siloxane-modified bifunctional (meth)acrylate may be present in a total amount of about 4 parts by weight to about 40 parts by weight relative to the total amount of 100 parts by weight of the monomer mixture for the (meth)acrylic prepolymer and about 3 parts by weight to about 25 parts by weight of the siloxane-modified bifunctional (meth)acrylate. Within this range, the adhesive film can exhibit low adhesive strength and good residue properties.

The siloxane-modified monofunctional (meth)acrylate may be present in an amount of about 1 wt % to about 15 wt %, for example, about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %, in the monomer mixture. Within this range, the adhesive film can exhibit low adhesive strength and good residue properties.

The siloxane-modified bifunctional (meth)acrylate may be present in an amount of about 3 parts by weight to about 25 parts by weight, for example, about 3, 4, 5, 6, 7, 8, 9, 10, 11, 12, 13, 14, 15, 16, 17, 18, 19, 20, 21, 22, 23, 24, or 25 parts by weight, relative to 100 parts by weight of the monomer mixture. Within this range, the adhesive film can exhibit low adhesive strength and good residue properties.

In one embodiment, the monomer mixture for the (meth)acrylic prepolymer may include about 65 wt % to about 98 wt % of the alkyl group-containing (meth)acrylate, about 0.1 wt % to about 20 wt % of the hydroxyl group-containing (meth)acrylate, and about 1 wt % to about 15 wt % of the siloxane-modified monofunctional (meth)acrylate. Within this range, the adhesive film can exhibit low peel strength and good residue properties.

The adhesive composition may include at least one of an initiator and a crosslinking agent. The initiator and the crosslinking agent are the same as those described above.

The initiator may be present in an amount of about 0.0001 parts by weight to about 5 parts by weight, preferably about 0.001 parts by weight to about 3 parts by weight, more preferably about 0.001 parts by weight to about 1 part by weight, relative to 100 parts by weight of the monomer mixture for the (meth)acrylic prepolymer. Within this range, the initiator allows complete curing of the adhesive composition, can prevent deterioration in transmittance of the adhesive film due to residual initiator, can reduce bubble generation, and can exhibit good reactivity.

The crosslinking agent may be present in an amount of about 0.5 parts by weight or more, specifically about 0.5 parts by weight to about 30 parts by weight, specifically about 5 parts by weight to about 20 parts by weight, relative to 100 parts by weight of the monomer mixture for the (meth)acrylic prepolymer. Within this range, the adhesive film can secure good mechanical strength and improvement in reliability.

The adhesive composition may optionally further include typical additives, such as antistatic agents, surfactants, curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), processing agents, UV blocking agents, fluorescent whitening agents, dispersants, heat stabilizers, photostabilizers, UV absorbers, coagulants, lubricants, solvents, and the like. The antistatic agent is the same as described above.

The adhesive composition may be free from an isocyanate-based type heat curing agent. If the adhesive composition includes the isocyanate-based type heat curing agent, the adhesive film cannot be used due to increase in peel strength with respect to a polyimide film.

In a second embodiment, the adhesive film may be formed of an adhesive composition that includes: a monomer mixture for a (meth)acrylic prepolymer including at least two kinds of (meth)acrylic monomers, a siloxane-modified monofunctional (meth)acrylate, and a siloxane-modified bifunctional (meth)acrylate. The siloxane-modified monofunctional (meth)acrylate and the siloxane-modified bifunctional (meth)acrylate form a (meth)acrylic prepolymer through partial polymerization.

The siloxane-modified monofunctional (meth)acrylate and the siloxane-modified bifunctional (meth)acrylate may be present in a total amount of about 4 wt % to about 40 wt %, for example, about 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %, in the monomer mixture for the (meth)acrylic prepolymer. Within this range, the adhesive film can exhibit low adhesive strength and good residue properties.

The siloxane-modified monofunctional (meth)acrylate may be present in an amount of about 1 wt % to about 15 wt %, for example, about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %, in the monomer mixture. Within this range, the adhesive film can exhibit low adhesive strength and good residue properties.

The siloxane-modified bifunctional (meth)acrylate may be present in an amount of about 3 wt % to about 25 wt %, for example, about 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, in the monomer mixture. Within this range, the adhesive film can exhibit low adhesive strength and good residue properties.

In one embodiment, the monomer mixture for the (meth)acrylic prepolymer may include about 50 wt % to about 95 wt % of the alkyl group-containing (meth)acrylate, about 0.1 wt % to about 20 wt % of the hydroxyl group-containing (meth)acrylate, about 1 wt % to about 15 wt % of the siloxane-modified monofunctional (meth)acrylate, and about 3 wt % to about 25 wt % of the siloxane-modified bifunctional (meth)acrylate.

The adhesive composition may include the crosslinking agent, the initiator, and the additives described above.

In a third embodiment, the adhesive film may be formed of an adhesive composition that includes: a monomer mixture for a (meth)acrylic prepolymer including at least two kinds of (meth)acrylic monomers; a siloxane-modified monofunctional (meth)acrylate; and a siloxane-modified bifunctional (meth)acrylate. The siloxane-modified monofunctional (meth)acrylate and the siloxane-modified bifunctional (meth)acrylate are added after preparation of the (meth)acrylic prepolymer.

The siloxane-modified monofunctional (meth)acrylate and the siloxane-modified bifunctional (meth)acrylate may be present in a total amount of about 4 parts by weight to about 40 parts by weight, for example, about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to 100 parts by weight of the monomer mixture. Within this range, the adhesive film can exhibit low adhesive strength and good residue properties.

The siloxane-modified monofunctional (meth)acrylate may be present in an amount of about 1 part by weight to about 15 parts by weight, for example, about 1, 2, 3, 4, 5, 6, 7, 8, 9, 10, 11, 12, 13, 14, or 15 parts by weight, relative to 100 parts by weight of the monomer mixture. Within this range, the adhesive film can exhibit low adhesive strength and good residue properties. The siloxane-modified bifunctional (meth)acrylate may be present in an amount of about 3 parts by weight to about 25 parts by weight, for example, about 3, 4, 5, 6, 7, 8, 9, 10, 11, 12, 13, 14, 15, 16, 17, 18, 19, 20, 21, 22, 23, 24, or 25 parts by weight, relative to 100 parts by weight of the monomer mixture. Within this range, the adhesive film can exhibit low adhesive strength and good residue properties.

In one embodiment, the monomer mixture may include about 40 wt % to about 99.9 wt % of the alkyl group-containing (meth)acrylate and about 0.1 wt % to about 60 wt % of the hydroxyl group-containing (meth)acrylate.

The adhesive composition may include the crosslinking agent, the initiator, and the additives described above.

In a fourth embodiment, the adhesive film may be formed of an adhesive composition that includes: a monomer mixture for a (meth)acrylic prepolymer including at least two kinds of (meth)acrylic monomers and a siloxane-modified bifunctional (meth)acrylate; and a siloxane-modified monofunctional (meth)acrylate. The siloxane-modified bifunctional (meth)acrylate forms the (meth)acrylic prepolymer through partial polymerization. The siloxane-modified monofunctional (meth)acrylate is added after preparation of the (meth)acrylic prepolymer.

The siloxane-modified monofunctional (meth)acrylate and the siloxane-modified bifunctional (meth)acrylate may be present in a total amount of about 4 parts by weight to about 40 parts by weight, for example, about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to the total amount of 100 parts by weight of the monomer mixture for the (meth)acrylic prepolymer and about 1 parts by weight to about 18 parts by weight of the siloxane-modified monofunctional (meth)acrylate. Within this range, the adhesive film can exhibit low adhesive strength and good residue properties.

The siloxane-modified monofunctional (meth)acrylate may be present in an amount of about 1 part by weight to about 15 part by weight, for example, about 1, 2, 3, 4, 5, 6, 7, 8, 9, 10, 11, 12, 13, 14, or 15 parts by weight, relative to 100 parts by weight of the monomer mixture. Within this range, the adhesive film can exhibit uniformly low adhesive strength and good residue properties.

The siloxane-modified bifunctional (meth)acrylate may be present in an amount of about 3 wt % to about 25 wt %, for example, about 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, in the monomer mixture. Within this range, the adhesive film can exhibit low adhesive strength and good residue properties.

In one embodiment, the monomer mixture may include about 70 wt % to about 96 wt % of the alkyl group-containing (meth)acrylate, about 0.1 wt % to about 20 wt % of the hydroxyl group-containing (meth)acrylate, and about 3 wt % to about 25 wt % of the siloxane-modified monofunctional (meth)acrylate.

The adhesive composition may include the crosslinking agent, the initiator, and the additives described above.

In a fifth embodiment, the adhesive film may be formed of an adhesive composition that includes: a monomer mixture for a (meth)acrylic prepolymer including at least two kinds of (meth)acrylic monomers and a first siloxane-modified monofunctional (meth)acrylate; a second siloxane-modified monofunctional (meth)acrylate; a siloxane-modified bifunctional (meth)acrylate. The first siloxane-modified monofunctional (meth)acrylate forms a (meth)acrylic prepolymer through partial polymerization. The second siloxane-modified monofunctional (meth)acrylate and the siloxane-modified bifunctional (meth)acrylate are added after preparation of the (meth)acrylic prepolymer.

The first siloxane-modified monofunctional (meth)acrylate may be the same compound as or a different compound from the second siloxane-modified monofunctional (meth)acrylate.

The first siloxane-modified monofunctional (meth)acrylate, the second siloxane-modified monofunctional (meth)acrylate, and the siloxane-modified bifunctional (meth)acrylate are present in a total amount of about 4 parts by weight to about 40 parts by weight, for example, about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to the total amount of 100 parts by weight of the monomer mixture for the (meth)acrylic prepolymer, about 1 part by weight to about 15 parts by weight of the second siloxane-modified monofunctional (meth)acrylate, and about 3 parts by weight to about 25 parts by weight of the siloxane-modified bifunctional (meth)acrylate. Within this range, the adhesive film can exhibit low adhesive strength and good residue properties. The adhesive composition may include the crosslinking agent, the initiator, and the additives described above.

In a sixth embodiment, the adhesive film may be formed of an adhesive composition that includes a monomer mixture for a (meth)acrylic prepolymer including at least two kinds of (meth)acrylic monomers and a first siloxane-modified bifunctional (meth)acrylate; a siloxane-modified monofunctional (meth)acrylate; and a second siloxane-modified bifunctional (meth)acrylate. The first siloxane-modified bifunctional (meth)acrylate forms a (meth)acrylic prepolymer through partial polymerization. The siloxane-modified monofunctional (meth)acrylate and the second siloxane-modified bifunctional (meth)acrylate are added after preparation of the (meth)acrylic prepolymer.

The first siloxane-modified bifunctional (meth)acrylate may be the same compound as or a different compound from the second siloxane-modified bifunctional (meth)acrylate.

The first siloxane-modified bifunctional (meth)acrylate, the second siloxane-modified bifunctional (meth)acrylate and the siloxane-modified monofunctional (meth)acrylate are present in a total amount of about 4 parts by weight to about 40 parts by weight, for example, about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight, relative to the total amount of 100 parts by weight of the monomer mixture for the (meth)acrylic prepolymer, about 3 parts by weight to about 25 parts by weight of the second siloxane-modified bifunctional (meth)acrylate, and about 1 part by weight to about 15 parts by weight of the siloxane-modified monofunctional (meth)acrylate. Within this range, the adhesive film can exhibit low adhesive strength and good residue properties. The adhesive composition may include the crosslinking agent, the initiator, and the additives described above.

The adhesive film may be prepared by photocuring the adhesive composition. In the adhesive composition, the monomer mixture including the (meth)acrylic prepolymer may be present in a non-polymerized phase or may be present in a prepolymer phase in which the monomer mixture is partially polymerized.

The adhesive composition may be prepared through partial polymerization of the (meth)acrylic prepolymer with an initiator, followed by adding an additional siloxane-modified monofunctional (meth)acrylate, an additional siloxane-modified bifunctional (meth)acrylate, an additional initiator, an additional crosslinking agent, and an additional additive. Partial polymerization may include solution polymerization, suspension polymerization, photopolymerization, bulk polymerization, or emulsion polymerization. Specifically, solution polymerization may be performed at about 50° C. to about 100° C. by adding an initiator to the monomer mixture. The initiator may include a photopolymerization initiator, such as an acetophenone compound including 2,2-dimethoxy-2-phenylacetophenone, 1-hydroxycyclohexylphenylketone, and the like, without being limited thereto. Partial polymerization may be performed to achieve a viscosity at 25° C. of about 1,000 cP to about 10,000 cP, specifically about 4,000 cP to about 9,000 cP. The adhesive film may be produced by a typical method. For example, the adhesive film may be produced by coating the adhesive composition onto a release film, followed by curing. Curing may be performed under a low-pressure lamp at a wavelength of about 300 nm to about 400 nm and a dose of about 400 mJ/cm$^2$ to about 3,000 mJ/cm$^2$ in an oxygen-free state.

An optical member according to one embodiment of the present invention includes an optical film and an adhesive film formed on at least one surface of the optical film, wherein the adhesive film includes the adhesive film according to the embodiments of the present invention.

The optical film may be formed of at least one resin selected from a polyethylene terephthalate resin, a polycarbonate resin, a polyimide resin, a poly(meth)acrylate resin, a cyclic olefin polymer resin, and an acrylic resin. The optical film may have a thickness of about 25 μm to about 250 μm, preferably about 50 μm to about 100 μm. Within this range, the optical film can support the adhesive film.

The optical member may further include a release film (liner) formed on the other surface of the adhesive film. The release film can prevent contamination of the adhesive film due to foreign matter. The release film may be formed of the same or different material than that for the optical film. The release film may have a thickness of about 10 μm to about 150 μm, preferably about 10 μm to about 75 μm. Within this range, the release film can efficiently support the adhesive film and can be easily peeled off.

An optical member according to another embodiment of the present invention includes an optical film and an adhesive film formed on at least one surface of the optical film, wherein the adhesive film includes the adhesive film according to the embodiments of the present invention.

The optical film may be formed of a polyimide film as a display panel. In one embodiment, the optical film may be composed of a light emitting diode layer and a polyimide film formed on at least one surface of the light emitting diode layer. An organic insulation layer or an inorganic insulation layer may be further interposed between the optical film and the adhesive film.

MODE FOR INVENTION

Next, the present invention will be described in detail with reference to some examples. However, it should be understood that these examples are provided for illustration only and are not to be construed in any way as limiting the present invention.

Example 1

100 parts by weight of a monomer mixture as listed in Table 1 and 0.005 parts by weight of Irgacure 651 as an initiator were sufficiently mixed in a reactor. After replacing dissolved oxygen in the reactor with nitrogen gas, the monomer mixture was subjected to partial polymerization through irradiation with UV light for several minutes using a low-pressure mercury lamp, thereby preparing a viscous liquid having a viscosity of 2,000 cP at 25° C. The viscous liquid may include a mixture of a copolymer of an acrylic monomer and a silicone-containing monomer, the acrylic monomer and the silicone-containing monomer, which were not polymerized.

0.5 parts by weight of an initiator (Irgacure 651) was added to the viscous liquid and mixed therewith, thereby preparing an adhesive composition. After removing bubbles from the adhesive composition, the adhesive composition was coated onto one surface of a polyethylene terephthalate (PET) base film (thickness: 75 μm) and a polyethylene terephthalate (PET) release film (thickness: 25 μm) was stacked thereon, followed by irradiation with UV light at a dose of 2,000 mJ/cm$^2$, thereby preparing an adhesive sheet of PET film/adhesive film/PET film.

Examples 2 to 9

Adhesive sheets of PET film/adhesive film/PET film were prepared in the same manner as in Example 1 except that components of each adhesive composition were changed as listed in Table 1 (unit: parts by weight).

Comparative Examples 1 to 4

Adhesive sheets of PET film/adhesive film/PET film were prepared in the same manner as in Example 1 except that components of each adhesive composition were changed as listed in Table 2 (unit: parts by weight).

The adhesive sheets of Examples and Comparative Examples were evaluated as to the properties as listed in Tables 1 and 2 and evaluation results are shown in Tables 1 and 2.

(1) Peel strength: Peel strength was measured using the adhesive sheets of PET film/adhesive film/release PET film prepared in Examples and Comparative Examples. After the release PET films were removed from the adhesive sheet, the adhesive film was laminated onto a polyimide film (SKC Kolon PI Co., Ltd., thickness: 50 μm) and was cut into a rectangular specimen having a size of 2.5 cm×10 cm (width×length). The specimen was left at room temperature for 30 minutes, followed by measuring peel strength under the following conditions. With the specimen attached to a TA instrument, peel strength was measured upon separation of the adhesive film from the specimen at 180° under conditions of 25° C. and a peeling rate of 2400 mm/min. The adhesive film was attached to a glass substrate and peel strength was measured using the same method.

(2) Transfer peel strength change rate: Transfer peel strength change rate was measured using the adhesive sheets of PET film/adhesive film/release PET film prepared in Examples and Comparative Examples. The adhesive film was obtained by removing both release PET films from the adhesive sheet. An adhesive tape (SDI Co., Ltd.) having a size of 25 mm×100 mm (width×length) was attached to a glass substrate and peel strength (C) was measured upon separation of the adhesive tape. The adhesive film was laminated onto the glass substrate and left in an oven at 40° C. for 10 days. The adhesive tape was attached again to the glass substrate from which the adhesive film is removed, followed by measuring peel strength (D). Peel strength was measured using the same method as in (1). The Transfer peel strength change rate was calculated by Equation 2.

(3) Anti-static performance (surface resistance): Surface resistance was measured using the adhesive sheets of PET film/adhesive film/release PET film prepared in Examples and Comparative Examples. A specimen of adhesive film/PET film was prepared by removing one PET film from the adhesive sheet. Surface resistance was measured on the specimen using MCP-HT450. In measurement of surface resistance, a voltage of 100 V was applied to the surface of the adhesive film for 10 seconds.

(4) Surface properties (Scattering properties): Surface properties were measured using the adhesive sheets of PET film/adhesive film/release PET film prepared in Examples and Comparative Examples. The adhesive sheet was cut into a specimen having a size of 50 mm×100 mm (width×length). An adhesive tape having an adhesive film on a PET film was prepared by removing one PET film from the adhesive sheet at 23° C. and 50% RH. Surface properties were evaluated using a surface property testing machine (HEIDON, Shinto Scientific Co., Ltd.). The adhesive tape was stacked on a glass substrate such that the adhesive film was placed at the uppermost side. Generation of particle scattering, agglomeration, creep, or breakage was evaluated on the surface of the adhesive film when a line was drawn on the surface of the adhesive film using an SUS (stainless) pen under the following conditions. Generation of no particle scattering, no agglomeration, no creep, or no breakage was evaluated as "good" and generation of particle scattering, agglomeration, creep, or breakage was evaluated as "poor".

Cross-sectional shape and diameter of SUS pen: A circular cross-section and a diameter of 1 mm Atmosphere temperature upon drawing with SUS pen: 25° C.

Drawing angle with SUS pen: 450 with respect to the surface of the adhesive film Drawing speed with SUS pen: 100 mm/min Drawing load with SUS pen: 1,000 g

TABLE 1

| | Example | | | | | | | | |
|---|---|---|---|---|---|---|---|---|---|
| | 1 | 2 | 3 | 4 | 5 | 6 | 7 | 8 | 9 |
| 2-EHA | 89 | 85 | 75 | 65 | 75 | 34 | 20 | 5 | 75 |
| 2-HEA | 5 | 5 | 5 | 5 | 5 | 5 | 5 | 5 | 5 |
| IBOA | — | — | — | — | — | 1 | 5 | 10 | — |
| SMZ 515E | 6 | 10 | 20 | 30 | 20 | 60 | 70 | 80 | 20 |
| Irgacure 651 | 0.5 | 0.5 | 0.5 | 0.5 | 0.5 | 0.5 | 0.5 | 0.5 | 0.5 |
| HDDA | 8 | 6 | 5 | 4 | 5 | 2 | 1 | 0.5 | — |
| TMPTA | — | — | — | — | — | — | — | — | 5 |
| HQ-115 | 0.2 | 0.2 | 0.2 | 0.2 | 0.2 | 0.2 | 0.2 | 0.2 | 0.2 |

TABLE 1-continued

| | Example | | | | | | | | |
|---|---|---|---|---|---|---|---|---|---|
| | 1 | 2 | 3 | 4 | 5 | 6 | 7 | 8 | 9 |
| BYK-3500 | — | — | — | — | 0.5 | — | — | — | — |
| Peel strength to polyimide film (gf/in) | 4.2 | 3.5 | 3.1 | 2.5 | 3.0 | 3.1 | 3.0 | 2.7 | 3.2 |
| Peel strength to glass substrate (gf/in) | 4.0 | 3.4 | 3.0 | 1.3 | 2.9 | 3.0 | 2.8 | 2.5 | 3.1 |
| Transfer peel strength change rate (%) | 93 | 93 | 92 | 91 | 92 | 92 | 93 | 93 | 92 |
| Anti-static performance ($10^9$ Ω/□) | 5.3 | 5.1 | 4.9 | 4.8 | 5.0 | 5.1 | 5.2 | 5.2 | 5.2 |
| Surface properties | Good | Good | Good | Good | Good | Good | Good | Good | Good |

TABLE 2

| | Comparative Example | | | |
|---|---|---|---|---|
| | 1 | 2 | 3 | 4 |
| 2-EHA | 95 | 95 | 60 | 5 |
| 2-HEA | 5 | 5 | 5 | 5 |
| IBOA | — | — | 15 | — |
| SMZ 7515E | — | — | 20 | 90 |
| Irgacure 651 | 0.5 | 0.5 | 0.5 | 0.5 |
| HDDA | — | 5 | 5 | — |
| HQ-115 | 0.2 | 0.2 | 0.2 | 0.2 |
| Peel strength to polyimide film (gf/in) | 13.7 | 9.6 | 7.8 | 0.2 |
| Peel strength to glass substrate (gf/in) | 12.9 | 9.2 | 7.1 | 0.1 |
| Transfer peel strength change rate (%) | 92 | 93 | 91 | 27 |
| Anti-static performance ($10^9$ Ω/□) | 5.9 | 6.0 | 5.5 | 4.3 |
| Surface properties | Good | Good | Poor (scattering) | Poor (creep) |

As shown in Table 1, the adhesive films of Examples had low peel strength to the polyimide film and thus could prevent damage to the polyimide film and/or shape change of the polyimide film upon separation of the adhesive film from the polyimide film after the adhesive film was attached thereto. In addition, the adhesive films of Examples had low peel strength to the glass substrate and thus could prevent damage to the glass substrate and/or shape change of the polyimide film upon separation of the adhesive film from the glass substrate after the adhesive film was attached thereto. Further, the adhesive films of Examples had high change rates of transfer peel strength according to Equation 2 and thus could improve usability by preventing foreign matter from remaining on an adherend even after the adhesive film was attached to the adherend at high temperature for a long period of time. Furthermore, the adhesive films of Examples could prevent generation of particle scattering and/or agglomeration, creep, scattering or breakage of the adhesive film upon cutting the adhesive film after the adhesive film was attached to the polyimide film.

Conversely, as shown in Table 2, the adhesive films of Comparative Examples had high peel strength with respect to the polyimide film and the glass substrate, and low change rates of transfer peel strength.

Example 10

100 parts by weight of a monomer mixture as listed in Table 3 and 0.005 parts by weight of Irgacure 651 as an initiator were sufficiently mixed in a reactor. After replacing dissolved oxygen in the reactor with nitrogen gas, the monomer mixture was subjected to partial polymerization through irradiation with UV light for several minutes using a low-pressure mercury lamp, thereby preparing a viscous liquid having a viscosity of 5,000 cP at 25° C. The viscous liquid may include a prepolymer of 2-ethylhexyl acrylate, 4-hydroxybutyl acrylate and a siloxane-modified monofunctional (meth)acrylate, 2-ethylhexyl acrylate, 4-hydroxybutyl acrylate, and the siloxane-modified monofunctional (meth)acrylate, which were not polymerized.

0.3 parts by weight of an initiator (Irgacure 651), 10 parts by weight of hexanediol diacrylate (HDDA), 0.5 parts by weight of an antistatic agent (FC-4400), and 15 parts by weight of a siloxane modified bifunctional (meth)acrylate (SM7530) were added to the viscous liquid and mixed therewith, thereby preparing an adhesive composition.

After removing bubbles from the adhesive composition, the adhesive composition was coated onto one surface of a polyethylene terephthalate (PET) base film (thickness: 75 μm, SCK Co., Ltd.) and a polyethylene terephthalate (PET) release film (thickness: 25 μm, Doray Advanced Materials Co., Ltd.) was stacked thereon, followed by irradiation with UV light using a low pressure mercury lamp at a dose of 2,000 mJ/cm² and irradiation with light for removal of residual monomer using a metal halide lamp at 1 J/cm², thereby preparing an adhesive sheet of PET film/adhesive film/PET film.

Examples 11 to 16

Adhesive sheets of PET film/adhesive film/PET film were prepared in the same manner as in Example 10 except that components of each adhesive composition were changed as listed in Table 3 (unit: parts by weight).

Example 17

100 parts by weight of a monomer mixture as listed in Table 3 and 0.005 parts by weight of Irgacure 651 as an initiator were sufficiently mixed in a reactor. After replacing dissolved oxygen in the reactor with nitrogen gas, the monomer mixture was subjected to partial polymerization through irradiation with UV light for several minutes using a low-pressure mercury lamp, thereby preparing a viscous liquid having a viscosity of 5,000 cP at 25° C. The viscous liquid may include a prepolymer of 2-ethylhexyl acrylate, 4-hydroxybutyl acrylate, a siloxane-modified bifunctional (meth)acrylate and a siloxane-modified bifunctional (meth)acrylate; and 2-ethylhexyl acrylate, 4-hydroxybutyl acrylate, the siloxane-modified monofunctional (meth)acrylate, and the siloxane-modified bifunctional (meth)acrylate, which were not polymerized.

0.3 parts by weight of an initiator (Irgacure 651), 10 parts by weight of hexanediol diacrylate (HDDA), and 0.5 parts by weight of an antistatic agent (FC-4400) were added to the viscous liquid and mixed therewith, thereby preparing an adhesive composition. An adhesive sheet was prepared using the adhesive composition in the same manner as in Example 10.

Examples 18 to 20

Adhesive sheets of PET film/adhesive film/PET film were prepared in the same manner as in Example 17 except that components of each adhesive composition were changed as listed in Table 4 (unit: parts by weight).

Comparative Example 5

An adhesive sheet of PET film/adhesive film/PET film was prepared in the same manner as in Example 10 except that components of each adhesive composition were changed as listed in Table 4 (unit: parts by weight).

The adhesive sheets of Examples and Comparative Examples were evaluated as to the properties as listed in Tables 3 and 4 and evaluation results are shown in Tables 3 and 4.

(1) Peel strength: Peel strength was measured using the adhesive sheets of PET film/adhesive film/release PET film prepared in Examples and Comparative Examples. The adhesive film was obtained by removing both PET films from the adhesive sheet. The adhesive film was attached to a polyimide film (Kolon Co., Ltd.) and was cut into a rectangular specimen having a size of 2.5 cm×10 cm (width×length). With the specimen attached to a TA instrument, peel strength was measured upon separation of the adhesive film from the specimen at 1800 under conditions of 25° C. and a peel rate of 2,400 mm/min.

The adhesive film was attached to a glass substrate (alkali-free glass substrate) and peel strength was measured using the same method.

(2) Anti-static performance (surface resistance): Surface resistance was measured using the same method as in Tables 1 and 2.

(3) Weight change rate: Weight change rate was measured using the adhesive sheets of PET film/adhesive film/release PET film prepared in Examples and Comparative Examples. The adhesive film was obtained by removing both release PET films from the adhesive sheet. An initial weight of the adhesive film was measured. Then, the adhesive film was left at 150° C. for 90 minutes and left at 25° C. for 15 minutes, followed by measuring the weight of the adhesive film. Weight change rate was calculated according to Equation 4.

(4) Residue ratio: Residue ratio was measured using the adhesive sheets of PET film/adhesive film/release PET film prepared in Examples and Comparative Examples. The adhesive tape was obtained by removing both release PET films from the adhesive sheet. As an adhesive sheet, an acryl adhesive film (self-produced) having a peel strength of 500 gf/in with respect to a glass substrate was used. With the adhesive sheet attached to the glass substrate, the adhesive sheet was cut to a size 25 mm×100 mm (width×length), followed by measuring peel strength upon separation of the adhesive sheet. The adhesive film was laminated onto the glass substrate and left in an oven at 50° C. for 10 days, followed by removing the adhesive film from the glass substrate. The adhesive tape was attached again to the glass substrate from which the adhesive film is removed, followed by measuring peel strength. Peel strength was measured using the same method as in (1). The residue ratio was calculated by Equation 3.

(5) Surface properties (Scattering properties): Surface properties were measured as listed in Tables 1 and 2 and evaluated by the following criteria.

Cross-sectional shape and diameter of SUS pen: A circular cross-section and a diameter of 1 mm Atmosphere temperature upon drawing with SUS pen: 25° C.

Drawing angle with SUS pen: 45° with respect to the surface of the adhesive film Drawing speed with SUS pen: 100 mm/min Drawing load with SUS pen: 300 g

TABLE 3

| | Example | | | | | | |
|---|---|---|---|---|---|---|---|
| | 10 | 11 | 12 | 13 | 14 | 15 | 16 |
| 2-EHA | 88 | 93 | 97 | 83 | 88 | 93 | 97 |
| 4-HBA | 2 | 2 | 2 | 2 | 2 | 2 | 2 |
| SM7515 | 10 | 5 | 1 | — | — | — | — |
| KF2012 | — | — | — | 15 | 10 | 5 | 1 |
| SM7530 | — | — | — | — | — | — | — |
| Irgacure 651 | 0.3 | 0.3 | 0.3 | 0.3 | 0.3 | 0.3 | 0.3 |
| FC-4400 | 0.5 | 0.5 | 0.5 | 0.5 | 0.5 | 0.5 | 0.5 |
| HDDA | 10 | 10 | 10 | 10 | 10 | 10 | 10 |
| SM7530 | 15 | 10 | 3 | 25 | 15 | 10 | 3 |
| Total amount* | 25 | 15 | 4 | 40 | 25 | 15 | 4 |
| Ratio (%)* | 21.7 | 13.6 | 3.9 | 32 | 21.7 | 13.6 | 3.9 |
| Peel strength to polyimide film (gf/in) | 2.3 | 2.8 | 3.0 | 2.1 | 2.2 | 2.9 | 3.1 |
| Peel strength to glass substrate (gf/in) | 2.4 | 2.9 | 2.9 | 2.3 | 2.2 | 3.0 | 2.6 |
| Anti-static performance ($10^9$ Ω/□) | 5.6 | 5.4 | 5.1 | 4.9 | 4.9 | 5.4 | 5.2 |
| Weight change rate (%) | 1.7 | 1.3 | 1.2 | 1.9 | 1.8 | 1.3 | 1.3 |
| Residue ratio (%) | 18 | 18 | 16 | 22 | 23 | 18 | 21 |
| Surface properties | Good | Good | Good | Good | Good | Good | Good |

TABLE 4

| | Example | | | | Comparative Example |
|---|---|---|---|---|---|
| | 17 | 18 | 19 | 20 | 5 |
| 2-EHA | 58 | 73 | 83 | 94 | 98 |
| 4-HBA | 2 | 2 | 2 | 2 | 2 |
| SM7515 | — | — | — | — | — |
| KF2012 | 15 | 10 | 5 | 1 | — |

TABLE 4-continued

| | Example | | | | Comparative Example |
|---|---|---|---|---|---|
| | 17 | 18 | 19 | 20 | 5 |
| SM7530 | 25 | 15 | 10 | 3 | — |
| Irgacure 651 | 0.3 | 0.3 | 0.3 | 0.3 | 0.3 |
| FC-4400 | 0.5 | 0.5 | 0.5 | 0.5 | 0.5 |
| HDDA | 10 | 10 | 10 | 10 | 10 |
| SM7530 | — | — | — | — | — |
| Total amount* | 40 | 25 | 15 | 4 | 0 |
| Ratio (%)* | 40 | 25 | 15 | 4 | 0 |
| Peel strength to polyimide film (gf/in) | 2.1 | 2.1 | 2.5 | 2.8 | 12.6 |
| Peel strength to glass substrate (gf/in) | 2.4 | 2.2 | 2.7 | 3.0 | 12.1 |
| Anti-static performance ($10^9$ Ω/□) | 4.8 | 5.0 | 5.3 | 5.1 | 5.4 |
| Weight change rate (%) | 1.8 | 1.9 | 1.6 | 1.5 | 1.1 |
| Residue ratio (%) | 24 | 22 | 17 | 15 | 11 |
| Surface properties | Good | Good | Good | Good | Poor |

*In Tables 1 to 4,

2-EHA: 2-ethylhexylacrylate (Daejung Chemical & Metals Co., Ltd.),

2-HEA: 2-hydroxyethylacrylate (Osaka Yuki),

4-HBA: 4-hydroxybutylacrylate (Osaka Yuki),

IBOA: Isobornyl acrylate (Osaka Yuki)

SMZ7515E: In Formula 1-1, n is an integer of 25 to 30 (KCC, molecular weight: 2,959), SM7515: In Formula 1-1, n is an integer of 20 to 70, $R_2$ is a methyl group, and $R_9$ is a methyl group (KCC Inc., molecular weight: 3000), KF2012: In Formula 1-1, n is an integer of 30 to 70, $R_2$ is a butyl group, $R_8$ is a propylene group, and $R_9$ is a methyl group (KCC Inc., molecular weight: 6000), SM7530: In Formula 5-1, n is an integer of 20 to 40, $R_{17}$ and $R_{18}$ are each independently a propylene group, and $R_{19}$ and $R_{20}$ are each independently a methyl group (KCC Inc., molecular weight: 4,000), Irgacure 651: Initiator (BASF)

HDDA: 1,6-hexanediol diacrylate (SK Cytec Co., Ltd.),

TMPTA: Trimethylolpropane triacrylate (Entis Co., Ltd.),

HQ-115: Antistatic agent (lithium bis(trifluoromethane-sulfonyl)imide, 3M)

BYK-3500: Silicone surfactant

FC-4400: Antistatic agent (3M, solid phase at 25° C.)

Total amount: Total amount of siloxane-modified monofunctional (meth)acrylate and siloxane-modified bifunctional (meth)acrylate Ratio: Ratio of total amount of siloxane-modified monofunctional (meth)acrylate and siloxane-modified bifunctional (meth)acrylate to total amount of siloxane-modified monofunctional (meth)acrylate, siloxane-modified bifunctional (meth)acrylate and acrylic monomer.

As shown in Tables 3 and 4, the adhesive films of Examples had low peel strength to the polyimide film and/or the glass substrate and thus could prevent damage and/or shape change upon separation of the adhesive film from the polyimide film or the glass substrate after the adhesive film was attached thereto. In addition, the adhesive films of Examples had good residue properties and could prevent generation of particle scattering and/or agglomeration, creep, detachment or breakage of the adhesive film upon cutting the adhesive film after the adhesive film was attached to the polyimide film or the glass substrate.

Conversely, the adhesive films of Comparative Example 5, which did not include the siloxane-modified monofunctional (meth)acrylate and the siloxane-modified bifunctional (meth)acrylate, had high peel strength and poor surface properties.

It should be understood that various modifications, changes, alterations, and equivalent embodiments can be made by those skilled in the art without departing from the spirit and scope of the invention.

The invention claimed is:

1. An adhesive film formed of at least two kinds of (meth)acrylic monomers for a (meth)acrylic prepolymer and a silicon-containing (meth)acrylate,
   the adhesive film having a peel strength of about 0.5 gf/in to about 5 gf/in with respect to a polyimide film at 25° C.

2. The adhesive film according to claim 1, wherein the silicon-containing (meth)acrylate comprises a siloxane-modified monofunctional (meth)acrylate.

3. The adhesive film according to claim 2, wherein the siloxane-modified monofunctional (meth)acrylate is represented by Formula 1:

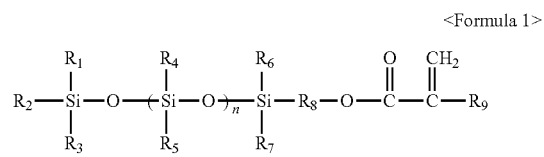

<Formula 1> where $R_1$, $R_2$, $R_3$, $R_4$, $R_5$, $R_6$, and $R_7$ are each independently a hydrogen, a $C_1$ to $C_{10}$ alkyl group, a $C_3$ to $C_{10}$ cycloalkyl group, or a $C_6$ to $C_{10}$ aryl group; $R_8$ is a $C_1$ to $C_{10}$ alkylene group or a $C_6$ to $C_{10}$ arylene group; $R_9$ is a hydrogen or a methyl group; and n is an integer of 10 to 100.

4. The adhesive film according to claim 2, wherein the adhesive film is formed of an adhesive composition comprising a monomer mixture comprising the at least two kinds of (meth)acrylic monomers for the (meth)acrylic prepolymer and the silicon-containing (meth)acrylate.

5. The adhesive film according to claim 4, wherein the adhesive film has a transfer peel strength change rate of about 85% or more, as calculated by Equation 2:

Transfer peel strength change rate=D/C×100,   <Equation 2> where C is a peel strength (unit: gf/in) of an adhesive tape with respect to a glass substrate; and D is a peel strength (unit: gf/in) of the adhesive tape with respect to a portion of the glass substrate from which the adhesive film is removed, after the adhesive film is laminated onto the glass substrate and is left in an oven at 40° C. for 10 days.

6. The adhesive film according to claim 4, wherein the silicon-containing (meth)acrylate is present in an amount of about 6 wt % to about 80 wt % in the monomer mixture.

7. The adhesive film according to claim 4, wherein the at least two kinds of (meth)acrylic monomers for the (meth)acrylic prepolymer comprises an alkyl group-containing (meth)acrylate and a hydroxyl group-containing (meth)acrylate,
   the monomer mixture comprising about 5 wt % to about 90 wt % of the alkyl group containing (meth)acrylate, about 1 wt % to about 15 wt % of the hydroxyl group-containing (meth)acrylate, and about 6 wt % to about 80 wt % of the silicon-containing (meth)acrylate.

8. The adhesive film according to claim 4, wherein the monomer mixture further comprises a cyclic functional group-containing (meth)acrylic monomer.

9. The adhesive film according to claim 8, wherein the cyclic functional group-containing (meth)acrylic monomer comprises a $C_3$ to $C_{15}$ alicyclic group-containing (meth)acrylate and a $C_3$ to $C_{15}$ hetero-alicyclic group-containing (meth)acrylic monomer having at least one of oxygen, nitrogen, and sulfur.

10. The adhesive film according to claim 8, wherein the cyclic functional group-containing (meth)acrylic monomer is present in an amount of about 1 wt % to about 10 wt % in the monomer mixture.

11. The adhesive film according to claim 1, wherein the adhesive film is formed of an adhesive composition comprising the at least two kinds of (meth)acrylic monomers for the (meth)acrylic prepolymer and a siloxane-modified monofunctional (meth)acrylate and a siloxane-modified bifunctional (meth)acrylate as the silicon-containing (meth)acrylate,
the siloxane-modified monofunctional (meth)acrylate and the siloxane-modified bifunctional (meth)acrylate being present in a total amount of about 3 wt % to about 40 wt % based on a total amount of the at least two kinds of (meth)acrylic monomers for the (meth)acrylic prepolymer, the siloxane-modified monofunctional (meth)acrylate, and the siloxane-modified bifunctional (meth)acrylate.

12. The adhesive film according to claim 11, wherein the adhesive film has a residue ratio of about 25% or less, as calculated by Equation 3:

Residue ratio=|B−A|/A×100,  <Equation 3> where A is a peel strength (unit: gf/in) of an adhesive tape with respect to a glass substrate, and
B is a peel strength (unit: gf/in) of the adhesive tape with respect to a portion of the glass substrate from which the adhesive film is removed, after the adhesive film is laminated onto the glass substrate and is left at 50° C. for 10 days.

13. The adhesive film according to claim 11, wherein the adhesive film has a weight change rate of about 2% or less, as calculated by Equation 4:

Weight change ratio=|F−E|/E×100,  <Equation 4> where E is an initial weight (unit: g) of the adhesive film, and
F is a weight (unit: g) of the adhesive film after the adhesive film is left at 150° C. for 90 minutes and left at 25° C. for 15 minutes.

14. The adhesive film according to claim 11, wherein the siloxane-modified bifunctional (meth)acrylate is represented by Formula 5:

<Formula 5>

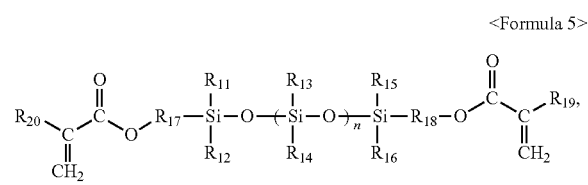

where $R_{11}$, $R_{12}$, $R_{13}$, $R_{14}$, $R_{15}$, and $R_{16}$ are each independently a hydrogen, a $C_1$ to $C_{10}$ alkyl group, a $C_3$ to $C_{10}$ cycloalkyl group, or a $C_6$ to $C_{10}$ aryl group; $R_{17}$ and $R_{18}$ are each independently a $C_1$ to $C_{10}$ alkylene group or a $C_6$ to $C_{10}$ arylene group; $R_{19}$ and $R_{20}$ are each independently a hydrogen or a methyl group; and n is an integer of 10 to 100.

15. The adhesive film according to claim 11, wherein the at least two kinds of (meth)acrylic monomers for the (meth)acrylic prepolymer comprise an alkyl group-containing (meth)acrylate and a hydroxyl group-containing (meth)acrylate.

16. The adhesive film according to claim 11, wherein the siloxane-modified bifunctional (meth)acrylate is present in an amount of about 2 wt % to about 25 wt % based on the total amount of the at least two kinds of (meth)acrylic monomers for the (meth)acrylic prepolymer, the siloxane-modified monofunctional (meth)acrylate, and the siloxane-modified bifunctional (meth)acrylate.

17. The adhesive film according to claim 11, wherein the adhesive film is formed of an adhesive composition comprising: a monomer mixture for the (meth)acrylic prepolymer comprising the at least two kinds of (meth)acrylic monomers and the siloxane-modified monofunctional (meth)acrylate; and the siloxane-modified bifunctional (meth)acrylate.

18. The adhesive film according to claim 17, wherein the siloxane-modified monofunctional (meth)acrylate and the siloxane-modified bifunctional (meth)acrylate are present in a total amount of about 4 parts by weight to about 40 parts by weight relative to a total amount of 100 parts by weight of the monomer mixture for the (meth)acrylic prepolymer and about 3 parts by weight to about 25 parts by weight of the siloxane-modified bifunctional (meth)acrylate.

19. The adhesive film according to claim 17, wherein the siloxane-modified monofunctional (meth)acrylate is present in an amount of about 1 wt % to about 15 wt % in the monomer mixture.

20. The adhesive film according to claim 17, wherein the siloxane-modified bifunctional (meth)acrylate is present in an amount of about 3 parts by weight to about 25 parts by weight relative to 100 parts by weight of the monomer mixture.

21. The adhesive film according to claim 11, wherein the adhesive film is formed of an adhesive composition comprising: a monomer mixture for the (meth)acrylic prepolymer comprising the at least two kinds of (meth)acrylic monomers, the siloxane-modified monofunctional (meth)acrylate, and the siloxane-modified bifunctional (meth)acrylate.

22. The adhesive film according to claim 21, wherein the siloxane-modified monofunctional (meth)acrylate and the siloxane-modified bifunctional (meth)acrylate are present in a total amount of about 4 wt % to about 40 wt % in the monomer mixture for the (meth)acrylic prepolymer.

23. The adhesive film according to claim 21, wherein the siloxane-modified monofunctional (meth)acrylate is present in an amount of about 1 wt % to about 15 wt % in the monomer mixture.

24. The adhesive film according to claim 21, wherein the siloxane-modified bifunctional (meth)acrylate is present in an amount of about 3 wt % to about 25 wt % in the monomer mixture.

25. The adhesive film according to claim 1, further comprising: an antistatic agent.

26. The adhesive film according to claim 25, wherein the adhesive film has a surface resistance of about $6.5 \times 10^9$ Ω/☐ or less.

27. The adhesive film according to claim 21, wherein the adhesive composition further comprises a crosslinking agent.

28. The adhesive film according to claim 27, wherein the crosslinking agent is present in an amount of about 0.5 parts by weight or more relative to 100 parts by weight of the monomer mixture.

29. An optical member comprising:
an optical film; and
the adhesive film according to claim 1, the adhesive film being formed on at least one surface of the optical film.

* * * * *